United States Patent [19]

Rider

[11] Patent Number: 4,566,327

[45] Date of Patent: Jan. 28, 1986

[54] SYSTEM AND TECHNIQUE FOR BANDWIDTH IMPROVEMENT IN MULTIFUNCTION SENSORS

[75] Inventor: Billie F. Rider, Cedar Rapids, Iowa

[73] Assignee: Rockwell International Corporation, El Segundo, Calif.

[21] Appl. No.: 570,479

[22] Filed: Jan. 13, 1984

Related U.S. Application Data

[63] Continuation-in-part of Ser. No. 435,516, Oct. 20, 1982, and a continuation-in-part of Ser. No. 370,641, Apr. 21, 1982, Pat. No. 4,444,053.

[51] Int. Cl.⁴ .............................................. G01P 15/09
[52] U.S. Cl. .................................... 73/510; 73/517 R
[58] Field of Search ............. 73/504, 505, 510, 517 R; 307/515; 329/50

[56] References Cited

U.S. PATENT DOCUMENTS

| | | | |
|---|---|---|---|
| 2,716,893 | 9/1955 | Birdsall | 73/504 |
| 3,304,786 | 2/1967 | Granquist | 73/517 R |
| 3,559,492 | 2/1971 | Erdley | 73/505 |
| 4,311,046 | 1/1982 | Pittman | 73/510 |
| 4,386,535 | 6/1983 | Albert | 73/504 |

Primary Examiner—Stewart J. Levy
Assistant Examiner—John E. Chapman, Jr.
Attorney, Agent, or Firm—George A. Montanye; H. Fredrick Hamann

[57] ABSTRACT

A system and technique is disclosed for providing a low-cost, two-axis rate and acceleration transducer assembly which has improved bandwidth for providing outputs of acceleration while reducing ripple. The system includes a sensor structure utilizing piezoelectric generator elements affixed in a rotating configuration and generating a periodic signal having amplitudes representing the rates and accelerations. The structure includes three pairs of sensors, wherein each sensor of each pair of sensors is spaced 180° from the other sensor of that pair about a rotating hub structure. One pair provides two-axis rate signals, while the remaining two pair provide two-axis acceleration signals. In the remaining two pair, each of the sensors of a pair are spaced 180° from one another and 90° from one of the elements of the other pair. A demodulator is coupled to receive the combined output of each acceleration pair to produce low ripple signals without filtering or with reduced filtering.

7 Claims, 31 Drawing Figures

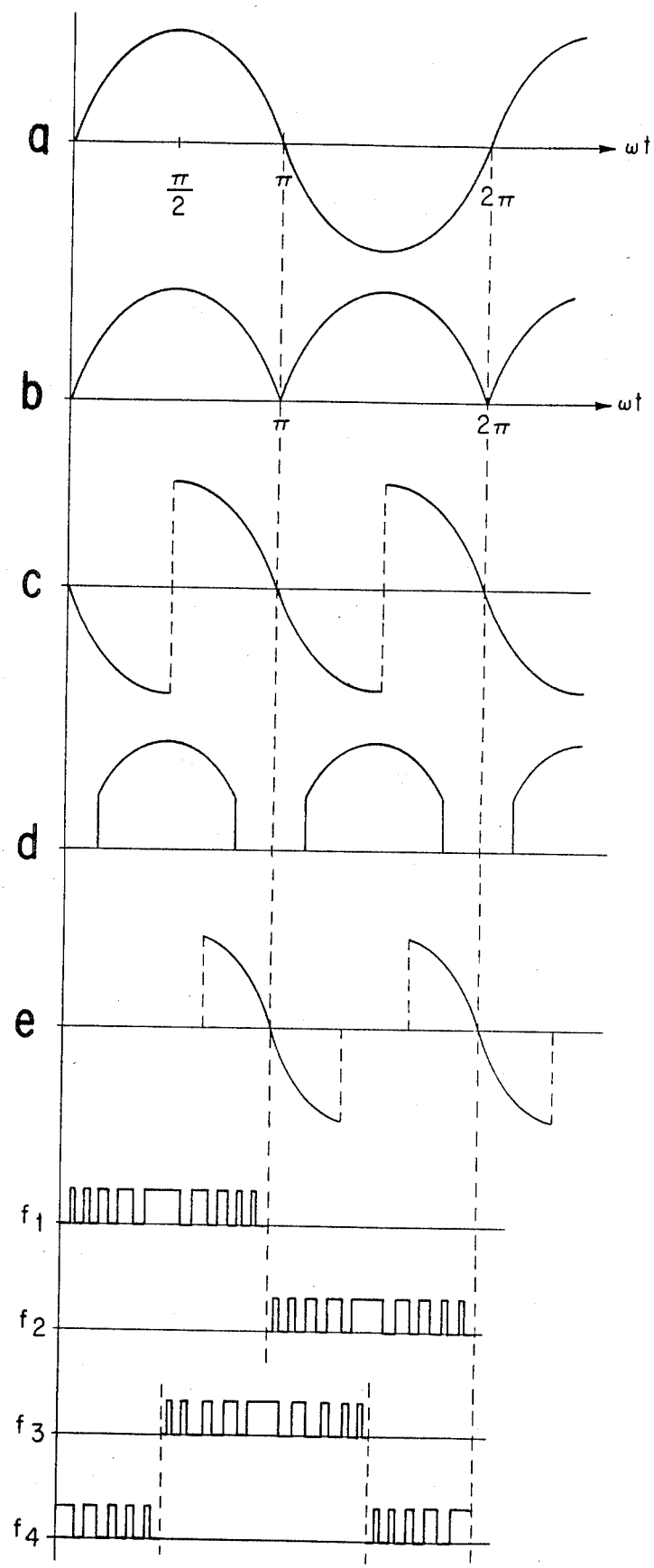

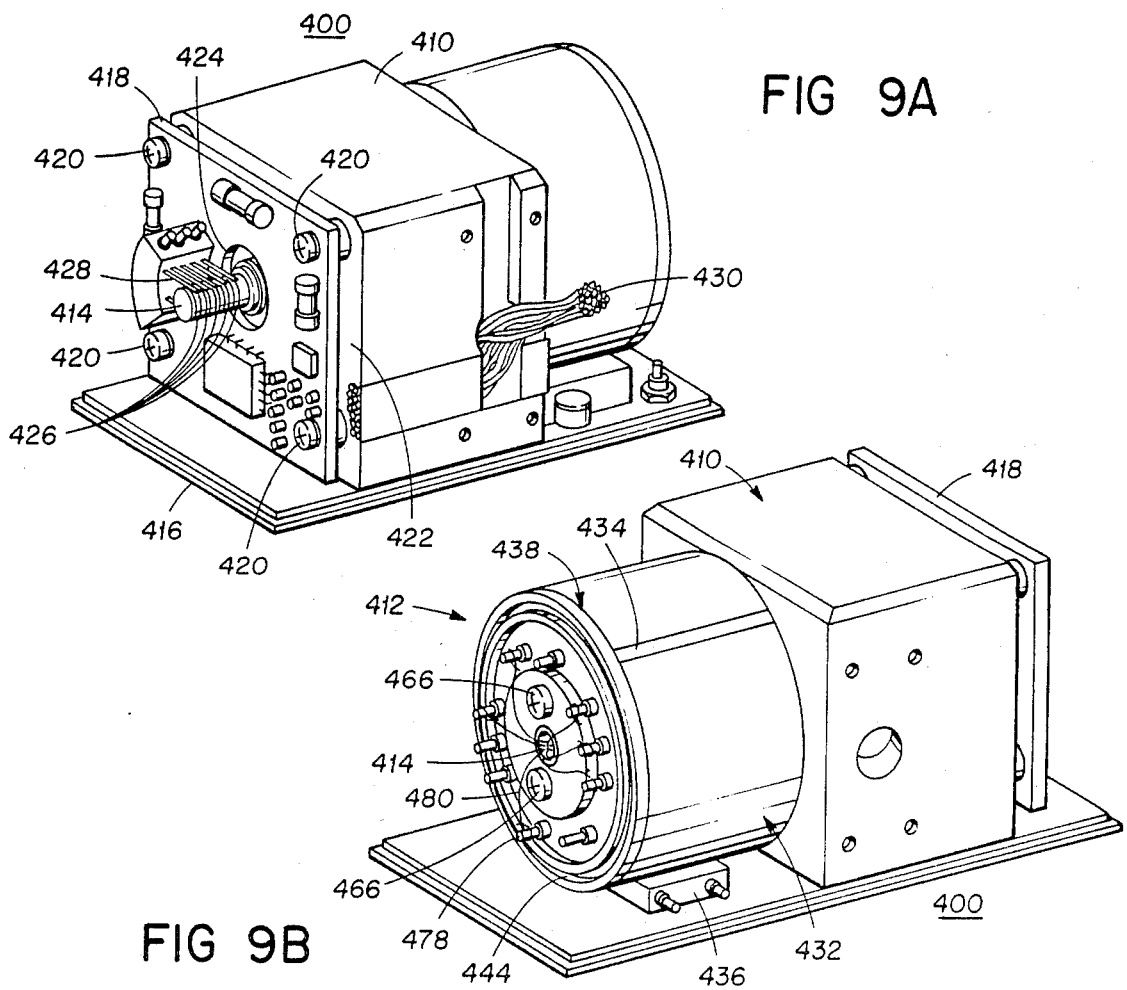
FIG 9A
FIG 9B
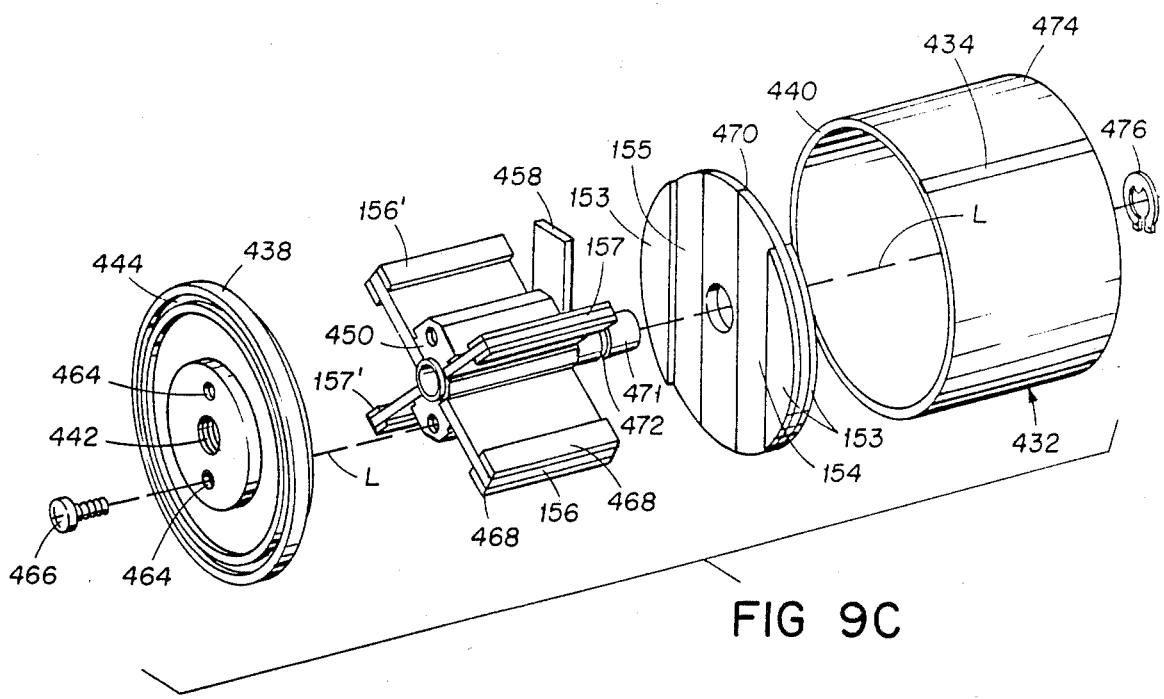
FIG 9C

DEGREES f₁ f₂ f₄ f₃

Aᵧ INPUT (EXAMPLE)

Aᵧ INPUT (EXAMPLE)

WHEEL PERIOD

RIPPLE

SIGNAL + RIPPLE

SYSTEM AND TECHNIQUE FOR BANDWIDTH IMPROVEMENT IN MULTIFUNCTION SENSORS

The U.S. Government has rights in this invention pursuant to contract DAAHO1-82-C-A309 granted by the U.S. Army.

This application is a continuation-in-part of my co-pending U.S. Pat. application Ser. No. 435,516 entitled "Precision Harmonic Rejecting Demodulator with Digital Phase Alignment", filed Oct. 20, 1982, and Ser. No. 370,641 entitled "Sensor Assembly for Strapped Down Attitude and Heading Reference System", filed Apr. 21, 1982, now U.S. Pat. No. 4,444,053. In addition, this application is related to my following co-pending U.S. patent applications: Ser. No. 402,529 entitled "Sensor Assembly Having Means for Cancellation of Harmonic Induced Bias from a Two-Axis Linear Accelerometer" filed July 28, 1982, now U.S. Pat. No. 4,462,254; Ser. No. 402,522 entitled "Cross-Axis Acceleration Compensation for Angular Rate Sensing Apparatus", filed July 28, 1982, now U.S. Pat. No. 4,520,669; Ser. No. 276,112 entitled "Piezoceramic Bender Element Having an Electrode Arrangement Suppressing Signal Development in Mount Region", filed June 22, 1981, now U.S. Pat. No. 4,443,729; and to Ser. No. 570,480 entitled "Integrated Multifunction Transducer Assembly", filed on even date herewith. All of these related applications are assigned to the same assignee as the instant application.

BACKGROUND OF THE INVENTION

This invention relates generally to reference apparatus for navigable vehicles such as aircraft, and more particularly, to rate/acceleration sensors used in an attitude and heading reference system. Advancement in the art of precision flight control and guidance apparatus for aircraft, missiles, and space vehicles depends in part on progress in sensor technology. Present computer technology allows sophisticated and complex signal processing at reasonable cost, but the information processed is frequently derived from sensors having a cost which is a disproportionate part of the system cost.

A reference system having inertial instruments rigidly fixed along a vehicle-based orientation reference wherein the instruments are subjected to vehicle rotations and the instrument outputs are stabilized computationally instead of mechanically is termed a gimballess or strapped-down system. Such systems generally include computing means receiving navaid data such as magnetic and radio heading; air data such as barometric pressure, density, and air speed; along with output signals of the inertial instruments for generating signals representative of vehicle position and orientation relative to a system of coordinate axes, usually earth oriented. The presence of high angular rates associated with strapped-down systems adversely affects performance and mechanization requirements. Consequently, such reference systems have been used extensively in missiles, space, and military vehicles, but their use in commercial aircraft has been less extensive because of economic constraints associated with the manufacture of precision mechanical assemblies, i.e., gyroscopes and other precision sensors.

Strapped-down inertial reference systems become practical for commercial aircraft from the standpoint of cost of ownership, weight, reliability, and maintainability with the advent of small, lightweight, highly accurate and relatively low-cost rate sensors and accelerometers. Angular rate sensing apparatus utilizing rotating piezoelectric generators are known; see for example U.S. Pat. Nos. 2,716,893 and 4,197,737. Such devices generally comprise piezoelectric generator elements mounted to a rotatable drive shaft and oriented for generating signals responsive to particular bending forces sensed by the instrument. The processing of signals derived from such instrumentation involves the measurement, amplification and transmission of very low level DC and low frequency signals.

While many of the problems inherent in the prior art have been overcome by the systems and techniques set forth in the aforementioned co-pending applications, all of which are herein incorporated by reference in their entirety, there are still problems which must be overcome to improve the accuracy of the systems and reduce the cost and complexity of construction. In particular, in one of the above-mentioned applications, two transducers are used to sense linear acceleration. The transducers are placed 90° apart in rotation in order to cancel known bias problems in the two-axis accelerometer output due to twice-spin frequency vibrations. The vibrations are present due to imperfections in the motor in particular, as well as possible external sources. In that system and technique, the undesired bias terms were cancelled by phase-shifting the signal from the leading transducer by 90° and adding it to the signal from the first transducer. Upon demodulation, the output was provided to a two-pole lowpass filter to limit the ripple generated from demodulating and phase detecting the sinusoidal accelerometer signals. This lowpass filter is the primary limitation on the bandwidth of the system and thus prevents use in environments requiring large bandwidths.

Furthermore, the structure used to measure alternating accelerations in the two-axis systems proposed above produce cross-axis coupling problems. For low frequency and static accelerations, such cross-axis coupling is negligible. In other cases, however, the cross-axis coupling is significant and is caused by the lowpass filter used to phase shift one of the transducer signals in the aforementioned systems. For broadband applications, the cross-axis coupling is undesirable and must therefore be reduced in order to provide less restrictive operating parameters so that the assemblies may be used for greater applications.

The rotating structure in the above-mentioned co-pending applications also produced improved results, but there is a further need for structures which enable miniaturization and configurations which enable demodulation to widen the bandwidth. Since the cost of producing the assembly is directly related to the complexity of the parts and their interrelationship, a reduction in the number of parts and the size of the assembly can significantly improve the applications in which the sensor may be employed. In addition, there is a need to provide sensors which may be easily disassembled for repair so that the cost of construction and replacement can be reduced.

Accordingly, the present invention has been developed to overcome the specific shortcomings of the above known and similar techniques and to provide an improved transducer assembly and demodulating system for providing two-axis rate and acceleration measurements.

SUMMARY OF THE INVENTION

In accordance with the invention, there is provided an improved transducer assembly and demodulating system applicable for obtaining two-axis acceleration with greater bandwidth and reduced ripple. In one embodiment of the invention, the sensor assembly includes four sensors spaced 90° apart about a hub and associated in pairs such that each sensor in a pair is spaced 180° from the other. The outputs of each sensor pair are coupled in common as the two inputs to a demodulator. The demodulator in turn provides an output of the two-axis components of linear acceleration with improved bandwidth due to a reduction in ripple requiring less filtering in the output. The same demodulation circuit reduces cross-axis coupling by eliminating the requirement for a phase shift circuit used in connection with a summing of the sensor signals in prior embodiments. The two outputs from the demodulator represent two-axis acceleration in accordance with the positioning of the transducer assembly in a host vehicle.

It is therefore a feature of the invention to provide a two-axis rate/accelerometer transducer system which provides improved acceleration bandwidth and less sensitivity to noise.

It is a further feature of the invention to reduce cross-axis coupling in a two-axis acceleration transducer system.

Still another feature of the invention is to provide a demodulator for a rate/acceleration transducer system which reduces ripple in the outputs representing acceleration.

Yet another feature of the invention is to provide a two-axis multi-function sensor system which includes four sensors spaced 90° apart and having associated pairs spaced 180° apart and having their outputs coupled in common to provide an improved sensor signal.

Yet still another feature of the invention is to provide an improved demodulating technique and switching system which eliminates the need for a lowpass filter for reducing ripple in the outputs representing linear acceleration in a two-axis system.

Still another feature of the invention is to provide a transducer assembly which combines the outputs of multiple sensors to compensate for imperfection and error signals in the individual sensors of a rotating system.

Yet another feature of the invention is to provide a demodulation technique on individual sensor signals which facilitates reduced complexity and manufacture of transducer assemblies.

These and other advantages and novel features of the invention will become apparent from the following detailed description when considered with the accompanying drawings wherein:

BRIEF DESCRIPTION OF THE DRAWINGS

FIG. 5 1s a diagramatic representation of linear acceleration sensors useful in explaining the operation of the system of FIG. 1.

FIG. 8 is a timing diagram useful in explaining the operation of the system of FIG. 1.

FIGS. 9A–9D are multiple perspective views of another embodiment of the transducer assembly forming an integral rotating transducer assembly in accordance with the present invention.

DESCRIPTION OF THE PREFERRED EMBODIMENT

Figure 1:
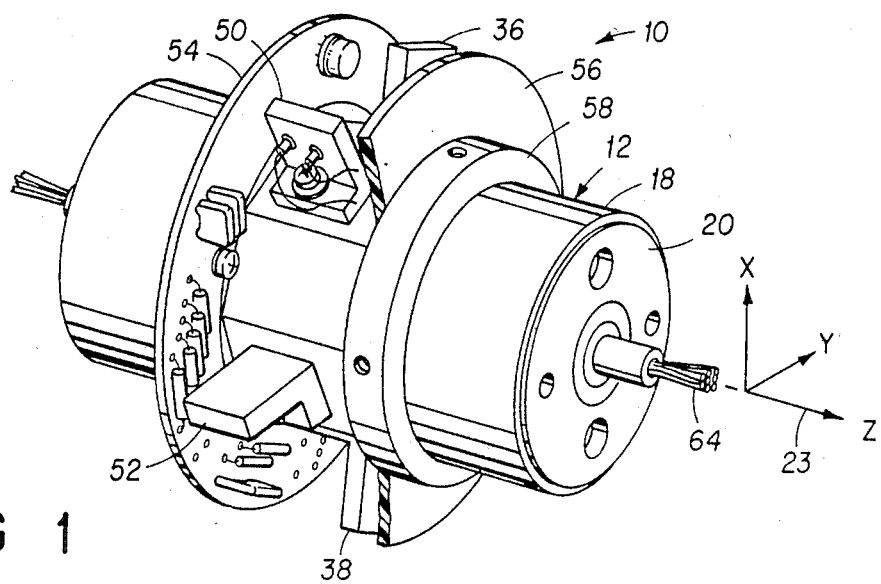
FIG. 1 is a pictorial view, partially cut away, of a sensor assembly which may be used in one embodiment of the present invention.
Figure 2:
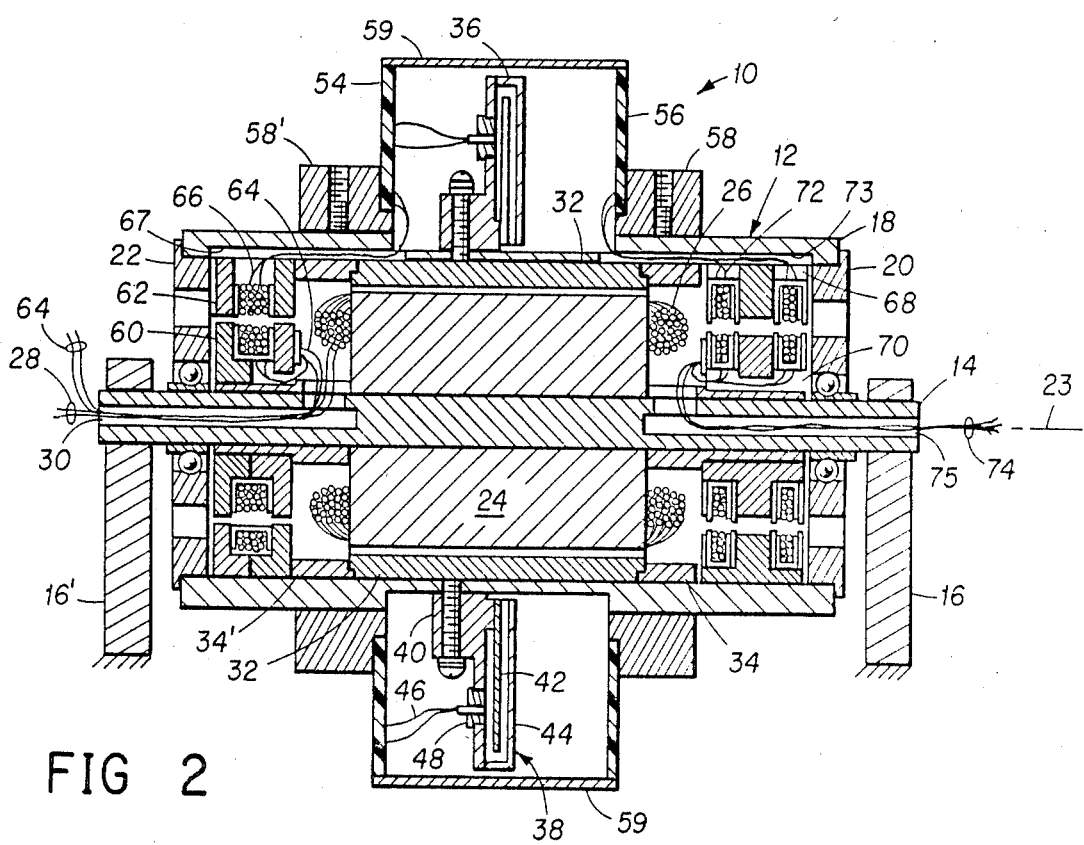
FIG. 2 is a sectional view of a sensor assembly in accordance with FIG. 1.

Referring now to the various views of the drawings for a more detailed description of the components, materials, construction, operation and other features of the structures which may be used in the practice of the invention, like numerals are used to refer to like elements throughout. Turning first to FIGS. 1 and 2, there is shown a sensor assembly 10 constructed for use with the present invention and detailed in any parent and related applications referenced above in this application. The sensor assembly 10 comprises a hysteresis motor 12 having a fixed axial shaft 14. The shaft 14 is mounted and rigidly affixed, at either end thereof, to a structural member 16, 16' having an orientation fixed with respect to a vehicle (not shown) in which the sensor assembly 10 is installed. A rotating element of the motor 12 comprises a cylindrical motor housing or sleeve 18 journaled for rotation about the shaft 14 on bearings 20, 22, the spin axis 23 of the sleeve 18 being coaxial with the shaft 14. The bearings 20, 22 are end-cap roller bearings bonded with a preload to the shaft 14 and pressed into the ends of the motor housing 18. A stator 24 and its associated windings 26 surrounds the shaft 14 and is affixed thereto. Leads 28 for supplying alternating current to the stator windings 26 emanate from the motor via a central bore 30 in the shaft 14. A cylindroid hysteresis ring 32 of magnetic material is mounted interiorly of the motor housing 18 for rotation therewith between a pair of ring spacers 34, 34'. The spacers 34, 34' are made from a non-magnetic material such as austenitic stainless steel, the preferred material being 304 stainless steel. The hysteresis ring 32 is juxtaposed with the stator 24, driving the rotating element in response to alternating current applied to the leads 28 of the stator windings 26. The motor housing 18 is made from martensitic stainless steel such as 416 stainless steel. The materials were chosen to keep the bearing thermal expansion loop matched with respect to coefficient of expansion so as to maintain the bearing preload over temperature extremes. A motor such as the motor 12 having a fixed shaft and stator, and an externally disposed rotating structure, is termed an inside-out motor.

A pair of piezoelectric (PE) ceramic assemblies 36, 38 are mounted exteriorly on the rotating motor housing 18 on opposite sides thereof. Each of the ceramic assemblies 36, 38 comprises a base 50 to which a piezoelectric bender element 42 is mounted in cantilever fashion. A cover 44 in cooperation with the base 40 extended encloses the bender element 42. Leads 46 conduct output signals generated by the piezoelectric bender elements 42 via feedthrough terminals 48 to electronic circuits carried on the rotating element of the sensor assembly 10.

Referring still to FIG. 1, a second pair of piezoelectric ceramic assemblies 50, 52 are shown mounted exteriorly on the rotating motor housing 18 for measuring accelerations in a plane perpendicular to the spin axis 23 of the sensor assembly 10. The ceramic assemblies 50, 52 are mounted having bending axes thereof essentially parallel with the spin axis 23 of the sensor assembly 10, and axes of sensitivity essentially perpendicular to the spin axis 23. "Essentially parallel" and "essentially perpendicular" mean as parallel and as perpendicular as manufacture will reasonably allow, but including some slight misalignment which may be detected in output signals generated by the ceramic assemblies. While the ceramic assemblies 50, 52, are shown mounted orthogonally of each other, they can be mounted with their axes of sensitivity displaced with respect to each other by any angle, or one could be omitted; however, a nominal 90° separation between two ceramic assemblies is the preferred arrangement for reasons which will be explained hereinafter.

A pair of annular circuit boards 54, 56 are mounted exteriorly of the motor housing 18 for rotation therewith by any suitable means such as collars 58, 58'. A cylindrical plate 59 (see FIG. 2) extending between the peripheral ends of the circuit boards 54, 56 encloses the space therebetween, serving as a dust cover for the circuit devices carried on the boards. The enclosure formed by the circuit boards 54, 56 and the plate 59 protects the PE ceramic assemblies 36, 38, 50, 52 from turbulent air currents which could be generated if the rotating components were not so protected. Referring to FIG. 2, an annular, air-gap power transformer having a stationary primary coil 60 affixed to the shaft 14, and a rotating secondary coil 62 concentric with the primary coil 60 and mounted inside the rotating sleeve 18 supplies power to electronic circuits on the circuit boards 54, 56. Power leads 64 transmitting alternating current are routed through the central bore 30 of the shaft 14 and connected to the primary coil 60 of the power transformer. Similarly, power leads 66 from the secondary coil 62 of the transformer are routed via a slot 67 in the motor housing 18 to the circuit boards 54, 56. An annular, air-core signal transformer having a primary coil 68 mounted inside the sleeve 18 for rotation therewith and a secondary coil 70 affixed to the shaft 14 couples output signals of circuits (components of which are shown in FIG. 1) on circuit boards 54, 56 via leads 72 routed through a slot 73 in the sleeve 18 to the primary coil 68, and from the secondary coil 70 via leads 74 routed through a central bore 75 of the shaft 14 to user circuits external of the sensor assembly 10.

Figure 3:
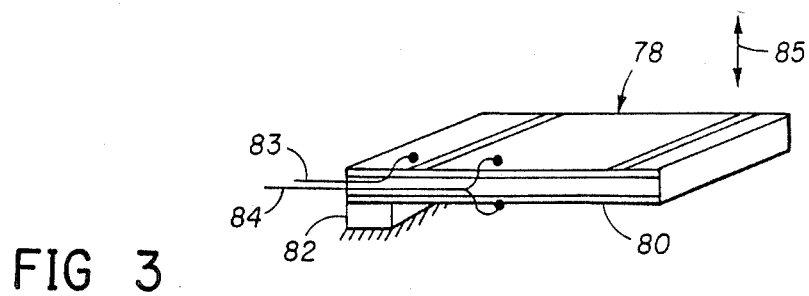
FIG. 3 is a pictorial view of a piezoelectric bender element utilized in the transducer of FIG. 1.

Referring now to FIG. 3, there is shown in greater detail a piezoelectric bender element 78 like the bender elements 42 of FIG. 2. The bender element 78 comprises a cantilevered piezoelectric-ceramic sensor 80 affixed to a mounting member or base 82. The bender element 78 generates a voltage $V_o$ on output leads 83, 84 which is proportional to the bending moment generated by accelerations acting on the mass of the sensor 80 itself along an axis of sensitivity illustrated by the line 85, the bending axis of the bender element 78 being in the plane of the sensor 80 and parallel with the longitudinal dimension of the base 82. The bender element 78 is inherently sensitive without the addition of proof mass.

Referring to FIG. 1, the desired accelerations are available when the piezoelectric bender elements 36, 38, 50, 52 are rotated at a fixed frequency, 3120 revolutions per minute in the presently described embodiment, about the spin axis 23 as shown in FIG. 1.

A measurement of linear acceleration is accomplished simply by measuring the phase and amplitude of the AC signal obtained by rotating the bender elements 50, 52 in the plane of interest. For rate measurement, the piezoelectric bender elements 36, 38 are oriented as shown in FIGS. 1 and 2 to sense acceleration along the spin axis 23. The bender elements 36, 38 are rotated at the fixed spin frequency, $\omega_n$, in radians per second, the spin axis 23 being oriented and fixed, for example, along the roll axis of an aircraft, and the sensor assembly 10 measures pitch and yaw rate. As the aircraft experiences an angular rate perpendicular to the spin axis, a useful coriolis acceleration along the spin axis acts on the mass of the bender elements 36, 38. At a point (r, $\alpha$) on the bender element, the acceleration along the spin axis is given by $$a = 2\omega_n r \dot{\theta} \cos(\omega_n t - \alpha) + 2\omega_n r \dot{\psi} \sin(\omega_n t - \alpha) \quad (1)$$

where $\dot{\theta}$ and $\dot{\psi}$ are pitch and yaw rates, r is the radial distance from the spin axis to the point on the bender element and $\alpha$ is the angular location of the point on the bender element from the axis about which angular rate is being sensed. A sinusoidal output voltage $V_o$ is generated by the bender element as a result of the force and stress exerted on the piezoceramic material therein. The output voltage is of the form:

$$V_o = K\dot{\theta}\omega_n \cos \omega_n t + K\dot{\psi}\omega_n \sin \omega_n t \quad (2)$$

where K is a sensitivity constant for the bender element, $\theta$ represents the angular displacement or tilt of the spin axis in the Y-Z plane, and $\psi$ represents the angular displacement or tilt of the spin axis in the X-Z plane. $\dot{\theta}$ and $\dot{\psi}$ are, respectively, $d\theta/dt$ and $d\psi/dt$ or angular rates, respectively, about the Y-axis and the X-axis as shown in FIG. 1. In the circuits of the instant invention, the output voltage $V_o$ is phase detected and measured to determine the desired rates $\dot{\theta}$ and $\dot{\psi}$. $V_o$ is an inherently bias-free AC signal; signal-to-noise ratios of several dB are exhibited at input rates equivalent to earth rate or less.

Figure 5:
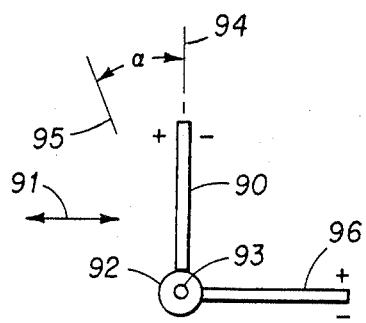

FIG. 5 illustrates an elementary form of a two-axis linear accelerometer such as the PE ceramic assemblies 50, 52 of FIG. 1. An acceleration-sensitive device 90 such as a piezoelectric bender element having an axis of sensitivity along a line 91 is affixed to a rotating element or shaft 92 rotating at an angular velocity $\omega_n$ about a spin axis 93. Acceleration components anywhere in the plane perpendicular to the spin axis 93 (the plane of the paper in FIG. 5) are measured; since such a plane is defined by two axes, the illustrated sensor is referred to as a two-axis accelerometer. Assuming that FIG. 5 shows the acceleration-sensitive element 90 at a reference time $\omega_n t = 0$; that a force on the positive (+) side of the element 90 generates a positive voltage proportional to the force; and that the force is local acceleration a(t) acting on the mass of the acceleration-sensitive device 90, then because of the rotation, the voltage generated is of the form:

$$v_1 = K\, a(T) \sin(\omega_n t + \alpha) \tag{3}$$

where K is a scale factor, a(t) is the local acceleration, $\alpha$ is an angle between a reference axis 94 of the acceleration-sensitive device 90 and the acceleration force a(t), the latter represented by a line 95. A utilizing means would typically measure the amplitude and phase of the voltage generated by the acceleration-sensitive device 90 to determine the amplitude and direction of the acceleration a(t); however, a problem arises when the measured acceleration contains a component at a frequency $2\omega_n$ as well as the normally steady-state or low frequency acceleration (g) which is the quantity of interest to be measured. That is, if $$a(t) = g + a_1 \sin 2\omega_n t \tag{4}$$

the voltage generated with reference to equation (3) contains a term which renders g indistinguishable from the $2\omega_n$ acceleration components. The problem is pervasive since rotating elements such as the rotating element 92 characteristically comprise ball bearings which commonly generate a $2\omega_n$ acceleration component.

The scale factor of the acceleration sensor is not determined by the spin speed of the sensor assembly since no coriolis is involved, the coriolis term being perpendicular to the sensitive axis of the acceleration sensor. Assuming that a constant acceleration (such as gravity) component exists along the line 91, the acceleration sensor 90 is bent by its own weight, and the bending direction is the same direction as the shaft 92 rotation. After the shaft 92 rotates 180°, the bending moment is essentially equal and opposite; therefore, a sinusoidal output signal is generated, the amplitude and phase depending on the relative direction of the g field in the sensitive plane. The accelerometer sensitivity has the form:

$$Q|_a = d_{31}\, \dot{P}\, W\, (\chi_2 - \chi_1)^3 a_{xy}(t) \cos(\omega_n t - \alpha) \tag{5}$$

Note that n is not a scale factor, and that $(\chi_2 - \chi_1)$ the active sensor. If the acceleration $a_{xy}(t)$ is a sinusoidal vibration $\omega_a$, the charge output has a sinusoidal component at frequencies $(\omega_a + \omega_n)$ and $(\omega_a - \omega_n)$. For most frequencies, these terms do not result in steady-state outputs; however, certain harmonic frequencies such as $\omega_a = 2\omega_n$ cause potentially serious performance problems. At $\omega_a = 2\omega_n$, a $1\omega_n$ signal and a $3\omega_n$ signal are generated. The $3\omega_n$ signal is rejected, but the $1\omega_n$ signal has the appearance of steady-state acceleration.

In order to measure the nominally steady-state component g in the presence of a $2\omega_n$ term, a second acceleration-sensitive device 96 is mounted to the rotating structure 92 and oriented at 90° from the first device 90 as shown in FIG. 5. The devices 90, 96 may be angularly displaced from each other by any non-zero angle, however, a 90° offset is preferred. If the sensitivity of the devices 90, 96 are virtually identical and the devices 90, 96 are physically oriented 90° apart, the $2\omega_n$ component will be cancelled if the output signal from the second acceleration-sensitive device 96 is shifted in phase by 90° and added to the output signal from the first device. Assume that a local gravity field g exerts a force along the null axis 94 of the sensor 90 at $\omega_n t = 0$, and that a positive force on the + side of the sensors 90, 96 generates, respectively, positive voltages $v_1$ and $v_2$. Because the rotating element 92 rotates at an angular velocity $\omega_n$, the sensor assembly acts as a modulator, and $$v_{out} = K\, a(t) \sin \omega_n t \tag{6}$$

Let $$a(t) = g + Hs \text{ in } (2\omega_n t + \beta) \tag{7}$$

Then $$v_1 = [g \sin \omega_n t + H \sin(2\omega_n t + \beta)] \sin \omega_n t\, K_1 \tag{8}$$

$$v_2 = [g \cos \omega_n t + H \sin(2\omega_n t + \beta)] \cos \omega_n t\, K_2 \tag{9}$$

Using the identities $$\sin\alpha\sin\beta = \frac{\cos(\alpha - \beta)}{2} - \frac{\cos(\alpha + \beta)}{2} \tag{10}$$

$$\sin\alpha\cos\beta = \frac{\sin(\alpha + \beta)}{2} + \frac{\sin(\alpha + \beta)}{2} \tag{11}$$

Then $$v_1 = \left[ g \sin\omega_n t + \frac{H\cos(\omega_n t + \beta)}{2} - \frac{H\cos(3\omega_n t + \beta)}{2} \right] K_1$$

$$v_2 = \left[ g \cos\omega_n t + \frac{H\sin(\omega_n t + \beta)}{2} + \frac{H\sin(3\omega_n t + \beta)}{2} \right] K_2$$

With only one sensor 90 or 96, H corrupts the apparent amplitude and phase of the acceleration vector g, and a $3\omega_n$ signal is generated and must be rejected. Ignoring in this instance the $3\omega_n$ component, cancellation of the H terms is accomplished if $v_2$ is delayed 90° electrically, whereby $v_2$ delayed becomes $v_{22}$ and $$v_{22} = \left[ g \sin\omega_n t - \frac{H\cos(\omega_n t + \beta)}{2} \right] K_{22} \tag{14}$$

$$v_1 = \left[ g \sin\omega_n t + \frac{H\cos(\omega_n t + \beta)}{2} \right] K_1 \tag{15}$$

adding (14) and (15) cancels the H terms if the scale factors $K_1$ and $K_{22}$ associated with the sensors 90, 96 are identical.

Referring again to FIG. 1, undesirable accelerations occurring in the spin plane (X,Y) of the sensor assembly 10 which may be caused by mechanical misalignments in the sensor assembly 10 and/or externally applied vibrations, apply force along the length of the rate sensors 36, 38. If the electrical null axis of the sensors 36, 38 is exactly in the X,Y plane, no output signal resulting from the unwanted accelerations is generated; however, such exactness is achieved only through precision mechanical assembly which precludes low-cost implementation. The present embodiment achieves low-cost implementation by providing electronic means for compensating for imprecise mechanical construction.

Figure 6A:
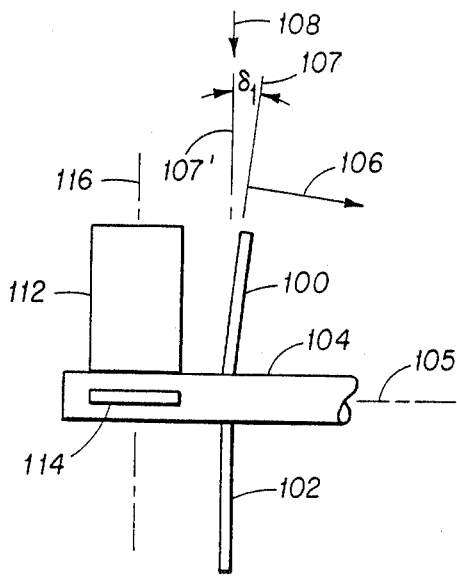
FIGS. 6A and 6B are diagramatic representations of angular rate and linear acceleration sensors useful in explaining the operation of the system of FIG. 1.

Referring now to FIG. 6A, there is shown a simplified diagram of a pair of piezoelectric bender elements 100, 102 mounted on a rotating member 104 having a spin axis along a line 105. The spin axis 105 is parallel with coriolis acceleration components to be measured by the bender elements 100, 102, the coriolis accelerations being developed when the spin axis 105 is rotated in space. The resulting acceleration is proportional to the rate of rotation of the rotating member 104 and is a well-known phenomenon.

Referring now to the bender element 100 of FIG. 6A (the description, however, being applicable to either element 100, 102), the bender element 100 is mounted on the rotating member 104 such that an acceleration-sensitive axis 106 of the sensor 100 is essentially parallel with the spin axis 105, i.e., as parallel as mechanical construction will allow, but shown considerably offset in the drawing for illustrative purposes. A null axis 107 of the sensor 100 exists such that steady-state or low frequency (relative to the resonant frequency of the sensor 100) accelerations along the null axis 107 generate no output signals from the sensor 100. On the other hand, acceleration components along the acceleration-sensitive axis 106 result in the generation of an electrical signal $V_c$ in the sensor 100 which is of the form:

$$V_c = K\dot{\phi}\omega_n \sin(\omega_n t + \alpha) \quad (16)$$

Figure 6C:
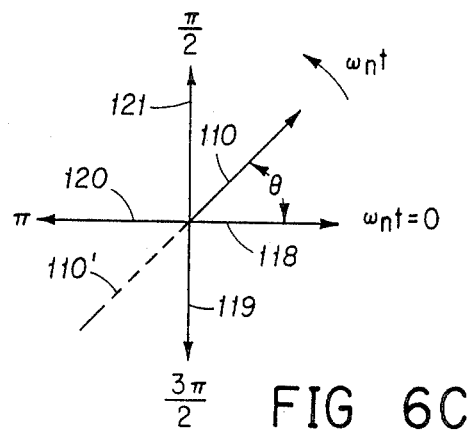
FIG. 6C is a vector diagram useful in explaining the operation of the system of FIG. 1.
Figure 6B:
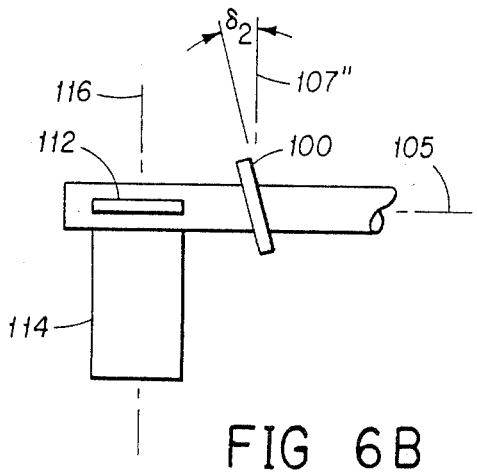

When the sensor 100 is misaligned by an angle $\delta_1$, from a true null axis 107' of the assembly as shown in FIG. 6A and/or by an angle $\delta_2$ from a true null axis 107'' as shown in FIG. 6B, and if a cross-axis acceleration 108 exists, then the sensor 100 generates a signal $V_{ca}$ responsive to the cross-axis acceleration 108 which is of the form:

$$V_{ca} = K\,a\delta \sin(\omega_n t + \alpha) \quad (17)$$

where $\alpha$ is a phase shift dependent on the orientation of the misalignment. Under certain circumstances, the signal output resulting from the misalignments $\delta_1$ and $\delta_2$ are indistinguishable from the desired signal. Misalignments $\delta_1$ and $\delta_2$ can be eliminated or reduced to tolerable levels by precise mechanical construction; however such precision construction is costly. Referring now to FIGS. 6A-C, FIG. 6C is a simplified vector diagram representative of the output signals developed by a misaligned acceleration-sensitive components such as the sensor 100. The existence of misalignments $\delta_1$ and $\delta_2$ results in an interfering signal represented by the vector 110. An interfering signal such as the signal 110 can be expected to be of random phase for non-precision assembly, i.e., the signal 110 may fall in any quadrant of the FIG. 6C diagram. Means must therefore be provided which compensate for an interfering signal at any angle.

Cross-axis acceleration compensation is accomplished in accordance with the described technique by two additional accelerometers 112, 114 mounted on the rotating member 104. The accelerometers 112, 114 measure the accelerations in the entire plane 116 perpendicular to the spin axis 105. While the accelerometers 112, 114 are shown angularly displaced from each other by 90°, they can be mounted at any non-zero angle with respect to each other; however, a nominal 90° separation is the preferred alignment. Referring still to FIGS. 6A-C, it is assumed that the accelerometers 112, 114 are aligned such that they nominally generate signals represented by vectors 118 and 119. Opposing vectors 120 and 121 may be generated by inverting, respectively, signals representative of the vectors 118 and 119; since the offending vector 110 can fall in any quadrant, a cancelling vector 110' to be configurable for any quadrant. A cancelling vector can be generated in any quadrant by effecting the sums of selected ones of the four vectors 118, 119, 120, 121 of sufficient amplitude to form the desired vector. In the example illustrated in FIG. 6C, the cancelling vector 110' is generated by selecting proper amplitudes of the $3\pi/2$ vector 119 and the $\pi$ vector 120.

Figure 6D:
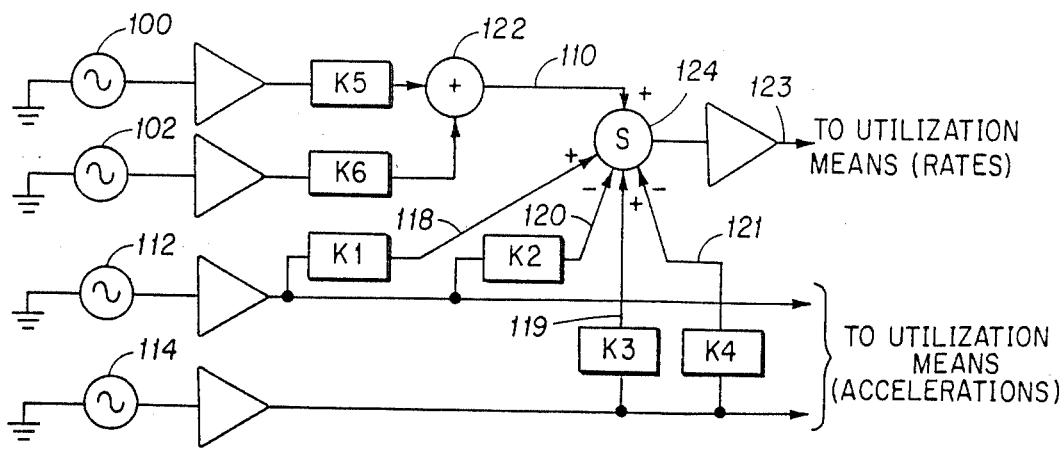
FIG. 6D is a simplified block diagram of one embodiment of compensation means utilized in the system of FIG. 1.

Referring now to FIG. 6D, the acceleration-sensitive devices 100, 102, 112, 114 described with reference to FIGS. 6A and 6B, are represented in FIG. 6D as sine wave generators 100, 102, 112, 114. The output signals of the rate sensors 100, 102 are combined after amplification in amplifiers having respective gains K5 and K6 in a summing means 122, the output signal of the summing means 122 comprising a desired signal 123 representative of the sensed angular rates plus the interfering signal 110. The output signals of the acceleration sensors 112, 114 are utilized to form the cancelling vector 110' by adjusting the appropriate gains K1, K2 corresponding respectively with the positive and negative output signal vectors 118, 120 of acceleration sensor 112, and gains K3, K4 corresponding respectively with the positive and negative output signal vectors 119, 121 of acceleration sensor 114, and selectively applying these signals to a summing means 124 along with the summed output signals of the angular rate sensors 100, 102. In the summing means 124, the cancelling vector 110' compensates for the interfering vector 110, and the output signal 123 consequently comprises only the desired angular rate components.

Figure 4:
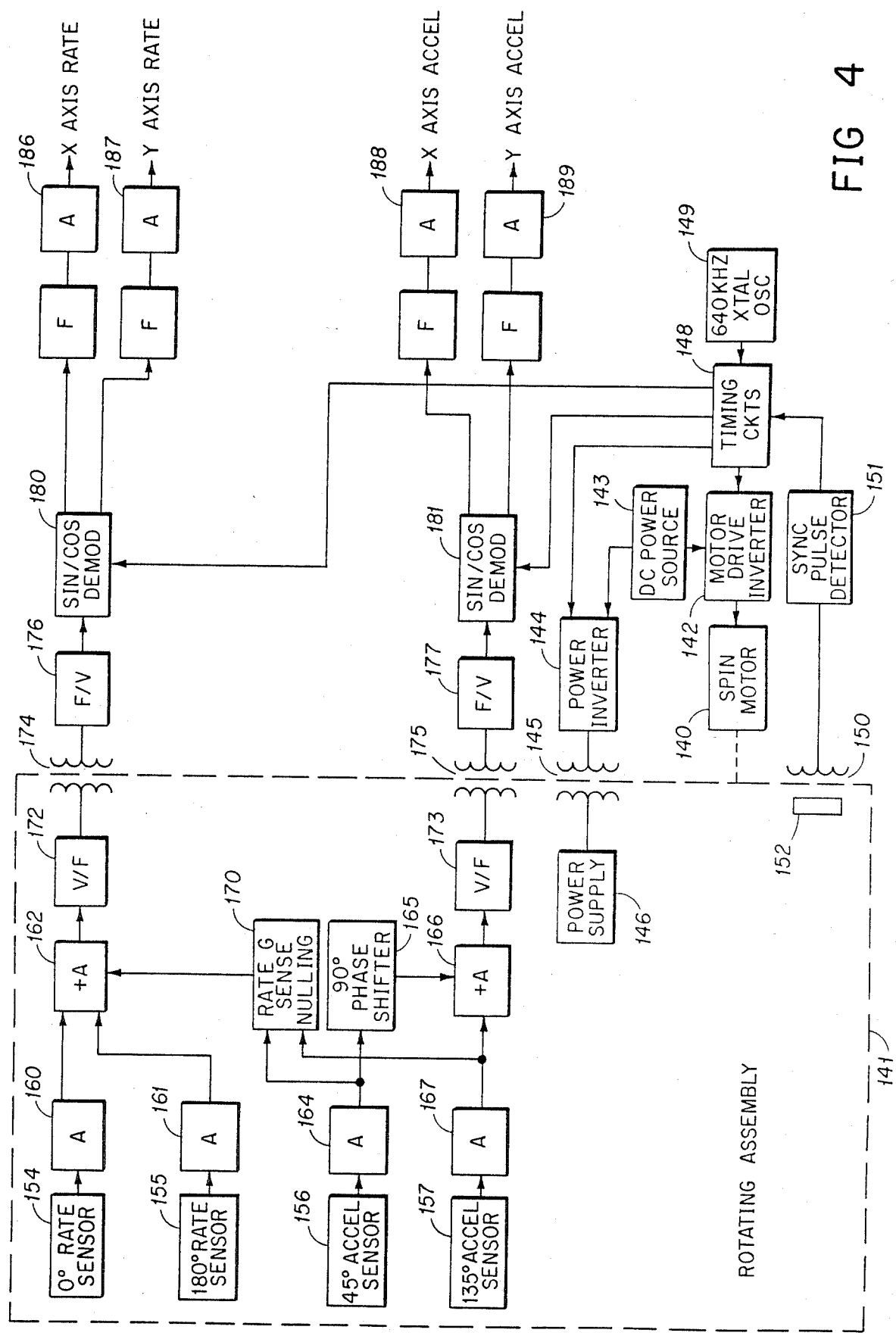
FIG. 4 is a schematic block diagram of the sensor assembly of FIG. 1 including circuit elements, both on and off the rotating structure, associated therewith.

FIG. 4 is a simplified block diagram of a two-axis rate and acceleration sensor assembly such as the sensor assembly 10 of FIG. 1, and the circuits associated therewith. The sensor assembly comprises a spin motor having a fixed stator assembly represented by the block 140 and a rotating assembly 141; circuits carried on the rotating assembly 141 are mounted on annular printed circuit boards previously described with reference to FIG. 1. The spin motor is a hysteresis synchronous motor driven by an inverter 142 operating from a regulated DC power source 143. A power inverter 144 serves as an AC power source for the circuits on the rotating assembly 141, the AC being coupled via an air-gap transformer 145 to a power supply 146 on the rotating assembly 141. The power supply 146 rectifies and filters the AC and supplies DC operating voltage to the circuits carried on the rotating assembly 141. Timing circuits 148 generate control signals and timing pulses for synchronizing and controlling the operation of the sensor circuits. The timing circuits 148 receive an input derived from a precision clock source, such as a 640 kHz ceramic oscillator 149 shown in the presently described embodiment. A synchronizing signal representative of the position of the rotating assembly 141 with respect to the fixed elements of sensor assembly is coupled from a transducer 150 via a sync pulse detector 151 to the timing circuits 148. The source of the synchronizing signal may be a magnetic element 152 affixed to the rotating assembly to which the transducer 150, e.g. a variable-reluctance coil, is responsive as the magnetic element 152 passes the fixed element 150. The position reference of the rotating assembly 141 may be generated alternatively by any suitable means such as optoelectronic devices.

Four miniature piezoelectric bender elements 154, 155, 156, 157 mounted on the rotating assembly 141 are used to sense the accelerations of interest. Two sensors 154, 155 are oriented with their sensitive axes parallel to the spin axis (as previously shown with reference to FIG. 1) to measure coriolis acceleration proportional to rates of turn about selected axes perpendicular to the spin axis. Two other sensors 156, 157 are mounted with their sensitive axes perpendicular to the spin axis for measuring linear accelerations in the plane perpendicular to the spin axis. Sinusoidal electrical signals generated by the rate sensors 154, 155 are coupled, respectively, via buffer amplifiers 160, 161 to a summing amplifier 162. Output signals generated by the acceleration sensor 156 are coupled via a buffer amplifier 164 and a 90° phase shift circuit 165 to a summing amplifier 166; output signals generated by the acceleration sensor 157 are coupled via a buffer amplifier 167 to the summing amplifier 166. A rate G-sense nulling circuit 170 provides means for coupling selectable portions of the signals generated by the acceleration sensors 156, 157 to the summing amplifier 162 for cancelling undesired signals representative of cross-axis accelerations sensed by the rate sensors 154, 155. The output signals of the summing amplifiers 162, 166 drive, respectively, two linear voltage-to-frequency converters 172, 173.

The output signal of the voltage-to-frequency converter 172 comprises a series of pulses 4 microseconds wide having a center frequency of approximately 60 kHz which varies in frequency proportional to the applied input voltage. The frequency-modulated output pulse train is coupled to the transformer 174 for transmission off the rotating element 141. The output signal of the voltage-to-frequency converter 173 is a series of pulses four microseconds wide having a center frequency offset approximately 2 kHz from the center frequency of the voltage-to-frequency converter 172, which offset center frequency varies in proportion to the applied input voltage. The output signal of the voltage-to-frequency converter 173 is coupled to the transformer 175 for transmission off the rotating assembly 141. The center frequencies of the voltage-to-frequency converters 172, 173 are offset to preclude cross-coupling of the acceleration signals to the rate signal circuits when the aircraft, in straight and level flight, experiences a relatively constant one-g acceleration field and comparatively very low rate-signal perturbations with virtually zero signal output.

The frequency-modulated pulses are converted back to analog voltages in frequency-to-voltage converters 176, 177. The regenerated signals output from the frequency-to-voltage converters 176, 177 are sinusoidal at the spin frequency of the rotating assembly 141, having amplitude and phase representative of the respective rate and acceleration components sensed by the rotating ceramic assemblies. Sin/Cos demodulators 180, 181 regenerate the analog voltages representative, respectively, of angular rate about two axes, and linear acceleration along two axes. Timing signals from the timing circuits 148 control the regeneration of the analog voltages; the synchronizing signal from the sync pulse detector 151 allows adjustment of the phase of the demodulator sampling function to compensate for phase shifts in the system. The demodulator 180, 181 output signals are filtered to remove the carrier (spin frequency) harmonics, and are coupled to an external user device such as an aircraft attitude and heading reference system via buffer amplifiers 186, 187, 188, 189.

Referring now to FIG. 7, a detailed electrical schematic diagram of the demodulators and associated circuits of FIG. 4 is shown in greater detail. Reference characters of like circuit elements are the same in FIGS. 4 and 7, the acceleration circuits being virtually identical. For simplicity, only the X and Y axis rate demodulator circuits are shown in FIG. 7. As aforementioned, the frequency-modulated pulses carrying the X and Y axis rate data are coupled via the air core rotary transformer 174 to the frequency-to-voltage converter 176. The output signal of the frequency-to-voltage converter 176 is coupled to an operational amplifier stage 300 which serves to remove DC bias from the regenerated sinusoidal signal, and further functions as a band-pass amplifier at the carrier frequency, i.e., 52 Hz, the frequency of rotation of the rotating element. Terminals labeled R, S, T are provided for strapping either a positive or a negative bias voltage to the non-inverting input of the operational amplifier 300. An output signal of the amplifier 300 is coupled through a buffer amplifier stage 304 to analog switches 312, 314, and through the buffer amplifier 304 and an inverting amplifier 308 to analog switches 318, 320. A thermistor 326 provides a changing bias voltage to the amplifier 304 in response to changes in ambient temperature in the equipment enclosure. The analog switches 312, 314, 318, 320 control regeneration of selected segments of the information-bearing sinusoidal signal in accordance with a predetermined pattern chosen to maximize gain of the fundamental component of the carrier signal and minimize gain of harmonic components of the signal.

Referring momentarily to FIG. 8, there is shown at FIG. 8A a sinusoidal signal corresponding with the signal input to the analog switches 312, 314, 318, 320 which is of the form:

$$v_1(t) = A(t) \sin \omega t + B(t) \cos \omega t + \text{noise} \qquad (18)$$

The desired signals A(t) and B(t) modulating the carrier signal are precision DC signals having a bandwidth which is small compared with the bandwidth of the carrier frequency $\omega$. The signal contains noise from DC to frequencies much higher than $\omega$; the noise voltage can be 40 dB or more greater than the signal voltage. FIGS. 8b and 8c illustrate the output signals generated by a conventional full-wave demodulator using switching elements, for example, analog switches conducting for 180° of the input waveform. When the FIG. 8b and 8c waveforms are lowpass filtered, analysis of the resulting DC signals shows that if the conduction periods of the switching elements are sufficiently accurate and are $\pi$ radians of the carrier frequency, cross-coupling approaches zero, DC bias in the input signal is rejected and does not appear at the output as a DC term, all even harmonics of the carrier frequency are rejected, non-harmonic AC input voltages do not generate DC voltages in the output signals, and all odd harmonics of the carrier that may be present in the input signal cause DC bias terms in the output signals. Thus, the primary weakness of a full-wave demodulator is its susceptibility to odd harmonics.

FIGS. 8d and 8e illustrate output waveforms (prior to lowpass filtering) achieved by changing the conductive periods of demodulator switching elements to $2\pi/3$ radians of the carrier frequency. The third harmonic of the fundamental carrier frequency of the input signal and odd multiples of the third harmonic are thereby rejected. The only remaining harmonics susceptible to regeneration are the fifth, seventh, eleventh, thirteenth, etc. Mathematical analysis shows that with respect to the fundamental term, the fifth harmonic gain is 1/5; the seventh, 1/7; the eleventh, 1/11; etc. Many applications require greater attenuation of these harmonics. Analog multipliers can be used for greater harmonic rejection by multiplying the input signal by a pure reference sine wave; however, in addition to being more expensive than the implementation of the presently-described embodiment of the invention, analog multipliers exhibit non-linearities in gain, drift in scale factor with temperature changes, and undesired bias output and bias drift.

One of the features of the present technique is the use in a demodulator of a store having a predetermined pattern of data stored therein, in concert with precision digital clocking to control the conduction periods of the switching elements. This approach eliminates major sources of non-linear gain, scale factor drift, bias drift, and harmonic susceptibility of the demodulator. Referring to FIG. 7, the 640 kHz clock signal from the system clock signal generator (149, FIG. 4) is input on a lead 328 to a divide-by-three counter comprised of J-K bistables 330, 332. A 213.3 kHz clock signal output from the bistable 332 is coupled via a lead 334 to a clock input C of a 12-stage binary counter 335 comprised of counter modules 336, 338, 340. The Q4 output of the first counter module 336 is a timing signal having a frequency of 13.3 kHz; the Q1 output signal of the second counter module 338 is a timing signal having a frequency of 6.67 kHz; and the Q4 output of the third counter module 340 is a timing signal having a frequency of 52.08 Hz, the frequency of revolution of the sensor assembly. The counter 335 functions as an address generator; the Q1-Q4 outputs, respectively, of the second and third counter modules 338, 340 form an address signal A0-A7 coupled to a fixed store or read-only-memory (ROM) 342 which in the presently-described embodiment is a commercially available 4×256 bit fixed store such as a model 5301 manufactured by Monolithic Memories, Inc. The fixed store 342 is comprised of 256 locations holding predetermined data items as listed in Table 1. Each of the data items is a 4-bit word corresponding with a different one of 256 segments of the sinusoidal signal input to the analog switches 312, 314, 318, 320. Each of the bits 01-04 of one of the data items in the fixed store 342 represents a control signal controlling, respectively, the four analog switches 312, 314, 318, 320. The 01-04 output signals of the store 342 are coupled via level converter and driver circuits 346 to control inputs, respectively, of the analog switches 312, 314, 318, 320; only one of the level converter and driver circuits 346 is shown in FIG. 7, for the 01 output signal of the store 342.

Referring now to FIG. 8 and Table 1 in conjunction with FIG. 7, the data patterns illustrated in FIGS. 8$f_1$-$f_4$ are a pictorial representation of the Table 1 data patterns generated, respectively, at outputs 01-04, the output data word of the store 342, when as the address signal A7-A0 is cycled from 0 to $255_{10}$. The patterns for each output 01-04 are identical, each pattern being symmetrical about its center. All of the bits in one bit position, ordered as a vertical column of bits from address 000 to address $225_{10}$ in Table 1, form a character string of control signals for controlling the operation of the analog switch which corresponds with the one bit position. A 1-bit in the output data word represents an enabling signal closing the analog switch corresponding with the digit position of the 1-bit during the time period (150 microseconds in the present embodiment) when the particular data item is addressed and read from the store 342; a 0-bit in the output data word represents an inhibiting signal which opens the analog switch corresponding with the digit position of the 0-bit during the time period when the data item is output from the store 342.

The ON time of each analog switch is thus varied in an approximate sinusoidal fashion over the half cycle wherein conduction is allowed, as shown in FIGS. 8$f_1$-$f_4$ and Table 1. The analog switch 312 conducts as illustrated in FIG. 8$f_1$ during the first half cycle of the input signal, and the analog switch 314 conducts as illustrated in FIG. 8$f_2$ during the second half cycle of the input signal to regenerate selected segments of the signal A(t) carried by the in-phase component of the carrier signal input to the analog switches 312, 314. The identical pattern is repeated for the analog switches 318, 320 but delayed by $\pi/2$ radians of the input signal as shown in FIGS. 8$f_3$ and $f_4$ to regenerate selected segments of the signal B(t) carried by the quadrature component of the input carrier signal. The input quadrature amplitude modulated signal as represented by FIG. 8a is thus divided into 256 segments for both the in-phase and the quadrature component of the signal, selected segments of each signal being regenerated for the in-phase component at an output node 360 of the analog switches 312, 314, and for the quadrature component at an output node 362 of the analog switches 318, 320. The back-to-back diodes (1N4454) connected between the input terminals of the switches 312, 314, 316, 318 and ground conduct non-selected segments of the input signal to ground, when the switches are open.

The configuration of the pattern of regenerated signal portions stored in the store 342 and the number of segments in each pattern are variables which can be easily optimized for a particular application. Any candidate pattern can be analyzed by conventional mathematical techniques to determine the relative gain at each harmonic of the carrier frequency. The general objective in selecting a pattern is to optimize the gain of the fundamental component and minimize the gain of the harmonic components. The weighting for each harmonic may be tailored for each application; for example, if the input signal is filtered by a lowpass filter, third harmonic

TABLE 1

| ADDRESS A7-A0 | DATA 04-01 | ADDRESS A7-A0 | DATA 04-01 |
|---|---|---|---|
| 0 | 0001 | 128 | 0010 |
| 1 | 0001 | 129 | 0010 |
| 2 | 0001 | 130 | 0010 |

TABLE 1-continued

| ADDRESS A7-A0 | DATA 04-01 | ADDRESS A7-A0 | DATA 04-01 |
|---|---|---|---|
| 3 | 0001 | 131 | 0010 |
| 4 | 0001 | 132 | 0010 |
| 5 | 0010 | 133 | 0010 |
| 6 | 0001 | 134 | 0010 |
| 7 | 0001 | 135 | 0010 |
| 8 | 1001 | 136 | 0110 |
| 9 | 0001 | 137 | 0010 |
| 10 | 0001 | 138 | 0010 |
| 11 | 0001 | 139 | 0010 |
| 12 | 1001 | 140 | 0110 |
| 13 | 0001 | 141 | 0010 |
| 14 | 0001 | 142 | 0010 |
| 15 | 1001 | 143 | 0110 |
| 16 | 0001 | 144 | 0010 |
| 17 | 0001 | 145 | 0010 |
| 18 | 1000 | 146 | 0100 |
| 19 | 0001 | 147 | 0010 |
| 20 | 1001 | 148 | 0110 |
| 21 | 0001 | 149 | 0010 |
| 22 | 1001 | 150 | 0110 |
| 23 | 1001 | 151 | 0110 |
| 24 | 0001 | 152 | 0010 |
| 25 | 1001 | 153 | 0110 |
| 26 | 0001 | 154 | 0010 |
| 27 | 1000 | 155 | 0100 |
| 28 | 1001 | 156 | 0110 |
| 29 | 0001 | 157 | 0010 |
| 30 | 1000 | 158 | 0100 |
| 31 | 1001 | 159 | 0110 |
| 32 | 1001 | 160 | 0110 |
| 33 | 0001 | 161 | 0010 |
| 34 | 1000 | 162 | 0100 |
| 35 | 1001 | 163 | 0110 |
| 36 | 0001 | 164 | 0010 |
| 37 | 1000 | 165 | 0100 |
| 38 | 1001 | 166 | 0110 |
| 39 | 1000 | 167 | 0100 |
| 40 | 1001 | 168 | 0110 |
| 41 | 1001 | 169 | 0110 |
| 42 | 1000 | 170 | 0100 |
| 43 | 1001 | 171 | 0110 |
| 44 | 1000 | 172 | 0100 |
| 45 | 0001 | 173 | 0010 |
| 46 | 1000 | 174 | 0100 |
| 47 | 1000 | 175 | 0100 |
| 48 | 1001 | 176 | 0110 |
| 49 | 1000 | 177 | 0100 |
| 50 | 1000 | 178 | 0100 |
| 51 | 1001 | 179 | 0110 |
| 52 | 1000 | 180 | 0100 |
| 53 | 1000 | 181 | 0100 |
| 54 | 1000 | 182 | 0100 |
| 55 | 1001 | 183 | 0110 |
| 56 | 1000 | 184 | 0100 |
| 57 | 1000 | 185 | 0100 |
| 58 | 1000 | 186 | 0100 |
| 59 | 1000 | 187 | 0100 |
| 60 | 1000 | 188 | 0100 |
| 61 | 1000 | 189 | 0100 |
| 62 | 1000 | 190 | 0100 |
| 63 | 1000 | 191 | 0100 |
| 64 | 1000 | 192 | 0100 |
| 65 | 1000 | 193 | 0100 |
| 66 | 1000 | 194 | 0100 |
| 67 | 1000 | 195 | 0100 |
| 68 | 1000 | 196 | 0100 |
| 69 | 1000 | 197 | 0100 |
| 70 | 1000 | 198 | 0100 |
| 71 | 1000 | 199 | 0100 |
| 72 | 1010 | 200 | 0101 |
| 73 | 1000 | 201 | 0100 |
| 74 | 1000 | 202 | 0100 |
| 75 | 1000 | 203 | 0100 |
| 76 | 1010 | 204 | 0101 |
| 77 | 1000 | 205 | 0100 |
| 78 | 1000 | 206 | 0100 |
| 79 | 1010 | 207 | 0101 |
| 80 | 1000 | 208 | 0100 |
| 81 | 1000 | 209 | 0100 |
| 82 | 0010 | 210 | 0001 |
| 83 | 1000 | 211 | 0100 |
| 84 | 1010 | 212 | 0101 |
| 85 | 1000 | 213 | 0100 |
| 86 | 1010 | 214 | 0101 |
| 87 | 1010 | 215 | 0101 |
| 88 | 1000 | 216 | 0100 |
| 89 | 1010 | 217 | 0101 |
| 90 | 1000 | 218 | 0100 |
| 91 | 0010 | 219 | 0001 |
| 92 | 1010 | 220 | 0101 |
| 93 | 1000 | 221 | 0100 |
| 94 | 0010 | 222 | 0001 |
| 95 | 1010 | 223 | 0101 |
| 96 | 1010 | 224 | 0101 |
| 97 | 1000 | 225 | 0100 |
| 98 | 0010 | 226 | 0001 |
| 99 | 1010 | 227 | 0101 |
| 100 | 1000 | 228 | 0100 |
| 101 | 0010 | 229 | 0001 |
| 102 | 1010 | 230 | 0101 |
| 103 | 0010 | 231 | 0001 |
| 104 | 1010 | 232 | 0101 |
| 105 | 1010 | 233 | 0101 |
| 106 | 0010 | 234 | 0001 |
| 107 | 1010 | 235 | 0101 |
| 108 | 0010 | 236 | 0001 |
| 109 | 1000 | 236 | 0100 |
| 110 | 0010 | 238 | 0001 |
| 111 | 0010 | 239 | 0001 |
| 112 | 1010 | 240 | 0101 |
| 113 | 0010 | 241 | 0001 |
| 114 | 0010 | 242 | 0001 |
| 115 | 1010 | 243 | 0101 |
| 116 | 0010 | 244 | 0001 |
| 117 | 0010 | 245 | 0001 |
| 118 | 0010 | 246 | 0001 |
| 119 | 1010 | 247 | 0101 |
| 120 | 0010 | 248 | 0001 |
| 121 | 0010 | 249 | 0001 |
| 122 | 0010 | 250 | 0001 |
| 123 | 0010 | 251 | 0001 |
| 124 | 0010 | 252 | 0001 |
| 125 | 0010 | 253 | 0001 |
| 126 | 0010 | 254 | 0001 |
| 127 | 0010 | 255 | 0001 | attenuation may be optimized at the expense of seventh, etc. The pattern shown in Table 1, based on a static store with 256 addresses, representing 256 signal segments or intervals, and four outputs, could be implemented with a smaller store augmented with additional logic circuits to replicate the pattern in proper polarity and phase relationship by techniques well known to digital circuit designers.

Table 2 below shows calculated harmonic gains for the patterns illustrated in FIGS. 8$f_1$-$f_4$ and shown in detail in Table 1, and for the pattern illustrated in FIGS. 8d-e. The value listed for the fundamental frequencies is a ratio of the observed DC output voltages to the peak sine wave input at the carrier frequency. The listed harmonic gains are with respect to the corresponding fundamental frequency.

TABLE 2

| Frequency | FIG. 8f and TABLE 1 Pattern | FIG. 8d-e Pattern |
|---|---|---|
| Fundamental | .508 | .55 |
| 3rd Harmonic | −65 dB | −∞ dB |
| 5th Harmonic | −40 dB | −14 dB |
| 7th Harmonic | −37 dB | −17 dB |
| 9th Harmonic | −38 dB | −19 dB |

The actual harmonic gains realized will be affected by the non-ideal response of the analog switches and amplifiers used in the demodulator. The degree of degradation is lower for low carrier frequencies and for high quality switches. The orthogonality of the demodulator is realized by the inherent precision of the store and the clock signal.

The in-phase component of the regenerated signal segments output at the node 360 of analog switches 312, 314 is coupled through a lowpass filter circuit 364 and the buffer amplifier 186 to an X axis rate output terminal for coupling to an external user device such as an aircraft attitude and heading reference system. The lowpass filter circuit 364 is provided with bias voltage selection terminals K, L, M for selecting either negative or positive bias voltage at the non-inverting input of the circuit. The regenerated quadrature component signal at the node 362 output of analog switches 318, 320 is coupled via a lowpass filter circuit 366 and the buffer amplifier 187 to a Y axis rate output terminal for coupling to the external user device.

Figure 7A:
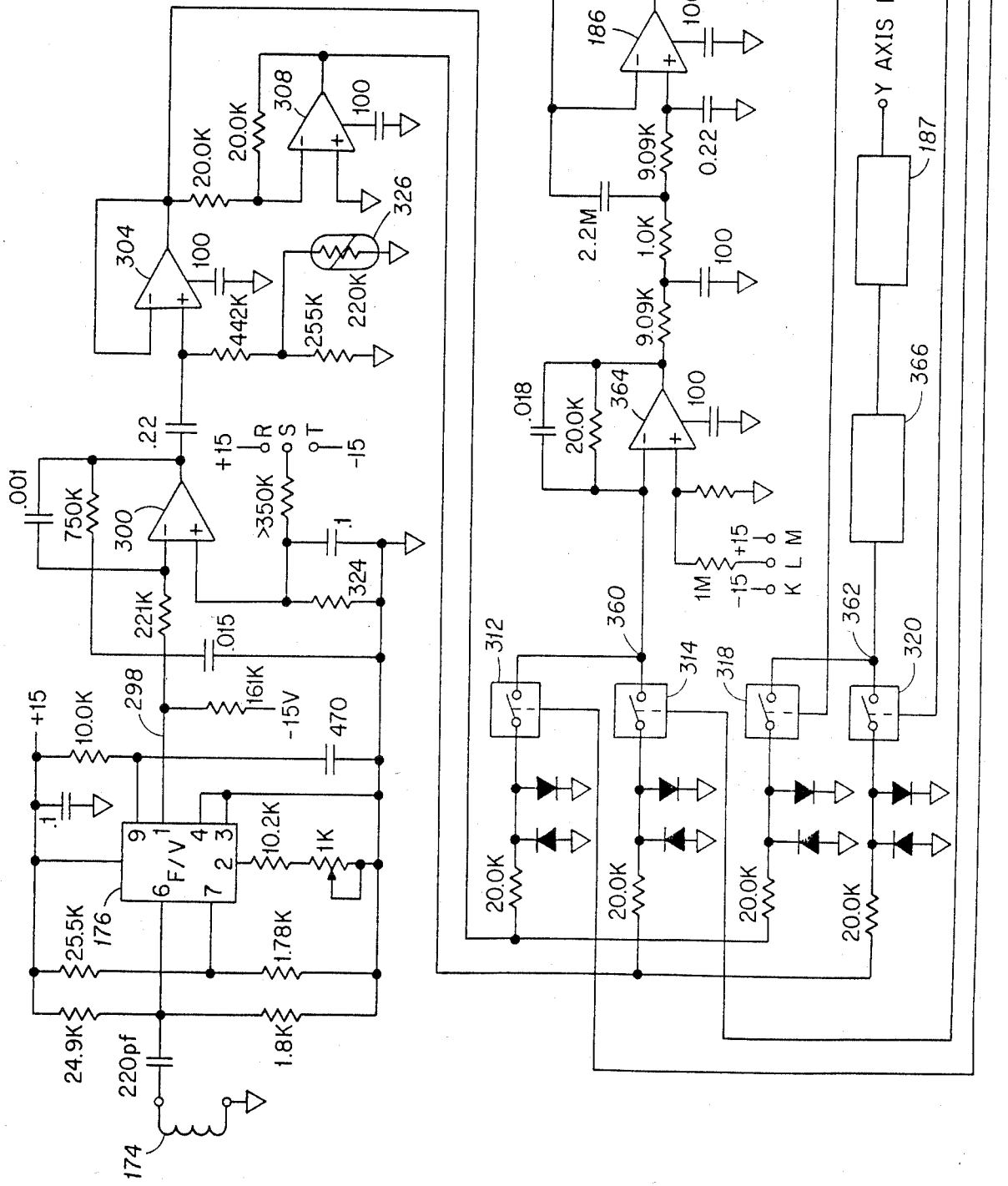
FIGS. 7A and 7B show a detailed electrical schematic diagram of one embodiment of a demodulator circuit useful in the system of FIG. 1.
Figure 7B:
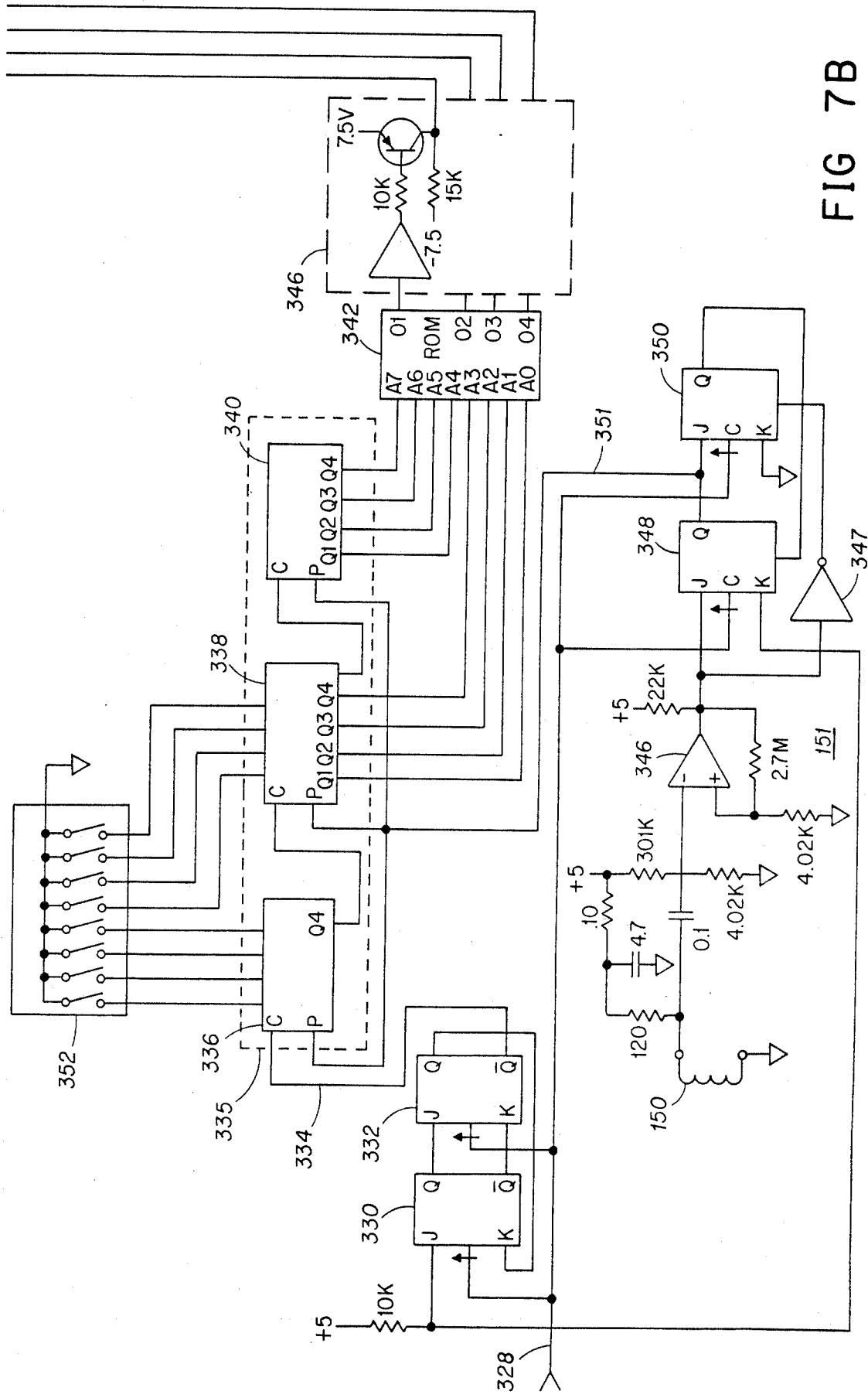

Referring to FIG. 7B, a synchronization pulse generator comprising a transducer 150 (described previously with reference to FIG. 4), an amplifier circuit 346, an inverter circuit 347 and two bistables 348, 350, provides a means for adjusting the phase of the sampling pattern to compensate for phase shifts in the system components, a synchronizing signal representative of the position of the rotating assembly (141, FIG. 4) with respect to the fixed elements of the sensor assembly is coupled from the transducer 150 through the amplifier 346 to the J input of bistable 348 and to the inverter circuit 347. The bistable 348 regenerates the synchronizing pulse at the Q output thereof on a lead 351 coupled to the preset input P of the counter modules 336, 338, 340. The bistable 348 aligns the regenerated synchronizing pulse with the 640 kHz timing signal input on the lead 328. The inverter circuit 347 and the bistable 350 form a latch holding the bistable 348 disabled subsequent to the regeneration of one synchronizing pulse.

The counter 336, 338, 340 is responsive to the regenerated synchronizing pulse on the lead 351 to preset the count stored therein to a predetermined number in accordance with signals output from a multiposition switch 352 coupled to the counter modules 336, 338; the Q4–Q1 output signals of the counter module 340 representing the high order address bits A7–A4 of the fixed memory 342 are preset to zero upon occurrence of the synchronizing pulse on the lead 351. Thus, the sampling vector of the demodulator is aligned with respect to the synchronizing pulse derived from the rotating mechanism, precluding the need for precision mechanical adjustments of the synchronization detector with respect to the rotating sensors. The address counters 336, 338, 340 cycle repetitively through the 256 addresses, and when a synchronizing pulse occurs, the counters are reset to the preset address. The preset address may be changed by means of the switch 352 to shift the occurrence of the zero address in time with respect to the synchronizing pulse, thereby shifting the entire sampling pattern in time with respect to the synchronizing pulse or reference time. The preset address may be stored as shown in the switch module 352, or in a system register or store location with the preset address being transferred to the counter under control, for example, of a system data processor responsive to the occurrence of the synchronizing signal. As implemented in FIG. 7B, the most significant bit of the switch 352, (corresponding with output Q4 of counter module 338 and address bit A3) moves the synchronization pattern approximately 11° C.; the least significant bit, by 0.09°, thereby providing accuracy to within ±0.05 percent of a desired setting.

The circuits utilized to implement the embodiment of the present invention described with reference to FIGS. 7 and 4 are commercially available components. The frequency-to-voltage converters 176, 177 are LM131A integrated circuits manufactured by National Semiconductor Corporation; the bias circuit 300 utilized a type 148 operational amplifier; the various filter, buffer amplifier and inverter circuits 186, 187, 304, 308, 364, 366 all utilized type 108 operational amplifiers; the inverter 347 is a component of a type 4049 integrated circuit; the amplifier circuit 346 is a type 139 operational amplifier; the analog switches 312, 314, 318, 320 are type 4066 integrated circuit modules; the bistables 330, 332, 348, 350 are type 4027 integrated circuit modules; the level converter and driver circuits 346 are comprised of, respectively, type 40109 signal-level translation integrated circuits and 2N3251A transistors; and the counter modules 336, 338, 340 are type 4029 integrated circuit modules.

Terms relating to digital signal operations utilized herein to describe the various embodiments are defined in *IFIP-ICC Vocabulary of Information Processing* compiled by the Joint Technical Committee on Terminology of the International Federation for Information Processing and the International Computation Centre, First English language edition, 1966, North-Holland Publishing Company, Amsterdam.

In accordance with the above techniques, improved and less expensive rate and acceleration signals have been obtained as was previously noted. However, there is still a need to reduce the complexity of the rotating sensor assembly in order to improve reliability and decrease costs, and also to overcome bandwidth limitations imposed by the use of lowpass filters to filter the two-axis acceleration signals. In accordance with the present invention therefore, an integrated multifunction transducer assembly has been developed which simplifies construction, provides improved accelerometer signals, reduces the weight and complexity of the rotating structure, provides improved reliability, allows balancing and sealing of the sensor assembly, and facilitates easy access for repair and replacement of parts. Furthermore, a demodulation system and technique has been developed which eliminates the need for lowpass filtering of the demodulated signals to thereby prevent cross-axis coupling effects while improving the bandwidth of the signals and reducing ripple in the dual axis outputs. The demodulator is particularly adapted to be used with the outputs of the integrated transducer assembly of FIG. 9 but may also be used with the system of FIG. 1 as will be described in greater detail below.

Referring first to FIG. 9, there is shown an integrated rotating multifunction assembly 400 in accordance with the present invention. The integrated assembly includes a motor assembly 410 and a transducer assembly 412 which is coupled to the rotating shaft 414 of the motor in assembly 410. The motor assembly may be any of a conventional miniaturized motor structure and may be, for example, of the hysteresis synchronous type. The motor assembly 410 carrying the transducer assembly 412 is in turn mounted to a base plate 416 for attachment along the appropriate axis of a host vehicle. The base plate 416 is constructed to form the base of a housing formed by the base plate 416 and a cover (not shown) which is placed over the motor assembly 410 and transducer assembly 412 to totally enclose both assemblies. Although a rectangular base plate 416 is shown implying a rectangular housing, any configuration of housing adaptable to the environment in which the multifunction assembly 400 is used, may accommodate the mounting of the structure.

In accordance with one embodiment of the invention, a circuit board 418 is mounted by screws 420 to a flat surface 422 of the motor assembly 410 at an opposite end of the shaft 414 on which the assembly 412 is mounted. As is particularly shown in FIG. 9A, the circuit board is mounted such that a portion of the shaft 414 extends perpendicularly through an opening 424 in the board 418. That portion of the shaft 414 includes slip-rings 426 surrounding the shaft which are coupled to provide transducer signals from the transducers in assembly 412 as will be described in greater detail below. The circuit board includes a structure carrying a plurality of flexible electrical contact arms 428 mounted to contact individual ones of said slip-rings 426 to provide an electrical output of the signals present on those slip-rings. Those electrical outputs are then in turn coupled for processing by other electronic components mounted on the circuit board or elsewhere, and the outputs then coupled through appropriate wiring 430 for use by external devices such as aircraft control systems.

The above-noted mounting of the circuit board 418 adjacent the motor housing facilitates miniaturization of the structure and thereby allowing a less complex design to be implemented for obtaining the appropriate signals. Furthermore, when the previously mentioned cover is attached to base plate 416, all of the elements within the cover are protected from outside exposure and shielded, but still allow convenient coupling through leads 430 for using the generated signals.

Referring now specifically to FIG. 9B, the transducer assembly 412 is shown coupled to the noted one end of the motor shaft 414 for rotation with said motor shaft. In the present embodiment, the assembly 412 includes an outer cylindrical member 432, which in the present instance may be a magnetic shielding material, that forms one portion of a housing containing the transducer elements. The cylindrical member 432 has a longitudinal axis L as shown in FIG. 9C which is coaxial with a longitudinal axis through the shaft 414 of the motor assembly 410. The member 432 includes an inlaid strip 434 on the outer surface thereof which is formed of a material different than the remainder of the member 432 to form a timing sync strip. The strip 434 may be formed by machining a U-shaped channel in the surface of member 432 parallel to the longitudinal axis L and the strip 434 inserted and attached so that its surface is flush with the surface of the member 432. This timing strip 434 is used in connection with a sync detector 436 which senses the position of the strip 434 as the reference angular position of the transducer assembly during its rotation to enable the generation of a timing sync pulse by element 436. Sync pulse detector 436 may be any conventional device attached to base plate 416 having a pair of electrical outputs 437 for providing a sync pulse in response to the strip 434. By way of example, the strip 434 may be a non-magnetic insert in a magnetic shell 432 which causes the generation of a pulse in a variable reluctance coil in response to the non-magnetic element passing the fixed detector 436 in a manner similar to that described with respect to elements 152 and transducer 150 in connection with the description of FIG. 4. While the particular strip detection technique is preferred in the present invention, it will be apparent that other detection techniques could be used without detracting from the present invention.

The housing enclosing the transducers is completed by the circular end plate 438 more particularly shown in FIG. 9C. This end plate is attached to the circular edge 440 of the cylindrical member 432 to form one end of the housing enclosing the acceleration transducers (sensors) 156, 156', 157 and 157', as well as the rate transducers (sensors) 154 and 155. The plate 438 includes a central circular opening 442 which is threaded and receives a corresponding threaded end of the shaft 414 for mounting the entire assembly on the shaft 414. The plate also includes an annular channel 444 extending, in the present embodiment, adjacent the outer edge of the plate 438. This channel is used to provide transducer assembly balancing as will be described in greater detail below.

Figure 9D:
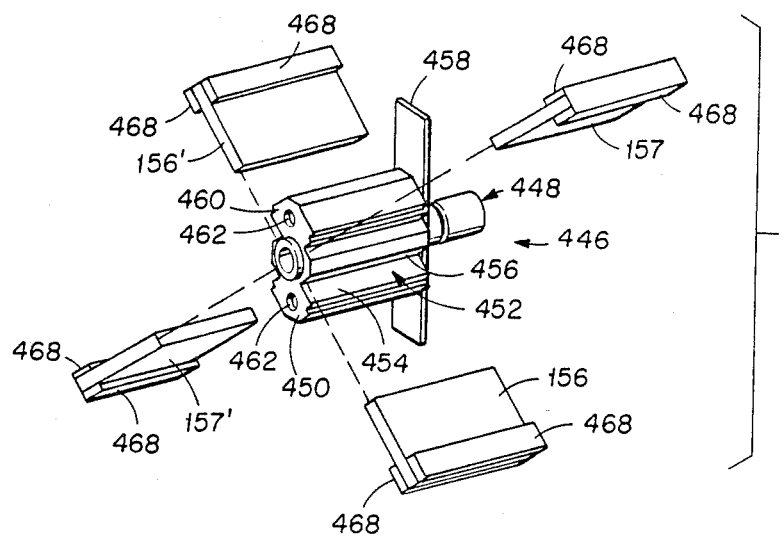

Referring now more particularly to FIG. 9D to understand the transducer mounting structure shown generally in FIG. 9C, there is shown a mounting structure 446 which includes an inner tubular member 448 extending through a block mounting portion 450 having grooves 452 formed by adjacent machined surfaces 454 and 456 extending parallel to the axis L and defining planes intersecting one another at 90°. The grooves 452 are positioned about the mounting portion 450 such that each groove 452 mounts one of said transducers such that all of the transducers 156, 156', 157 and 157' are positioned angularly about the axis L at 90° with respect to one another.

Attached integrally at one end of the portion 450 is a mounting strip 458 which extends perpendicular to the axis L along a face of 450 which is also perpendicular to the axis L. A face 460 opposite to the face of the portion 450 mounting the strip 458 includes two threaded holes 462 which are positioned to align with corresponding openings 464 in plate 438 so that the portion 446 may be rigidly attached to the plate 438 for rotation therewith by use of threaded screws 466.

A circular wafer 470 as seen in FIG. 9C is the dual element piezoceramic rate transducer having rate transducer sections 154 and 155 mounted 180° apart and including weights 153 of identical configuration mounted symmetrically on opposed surfaces of the wafer 470 and associated with each section 154 and 155. The wafer 470 is in turn rigidly mounted to the strip 458 so that the rate transducer sections 154 and 155 are symmetrical about the axis L and also positioned at the predetermined angular relationship noted with respect to the acceleration sensors 156 and 157 as was more particularly described with reference to FIG. 1 and FIG. 4 and is now more particularly shown in FIG. 10. Since the reasons for this specific arrangement were previously described, no further detail is necessary to understand the positioning now shown. However, it should be noted that the acceleration transducers are specifically arranged to form transducer pairs 156, 156' and 157, 157' wherein the transducers of each pair are located angularly 180° from one another about the axis L and each transducer is angularly positioned 90° with respect to the transducers of the adjacent pair. The outputs from the related pairs are then used in order to obtain an improved signal as will be discussed in greater detail below.

Although the acceleration transducers were previously described in connection with FIG. 1, and the same are similarly formed in FIG. 9C, additional weight in the form of weighted strips 468, are coupled to symmetrically extend on either side of the transducer parallel to the axis L in order to improve the sensitivity of the sensor to acceleration signals.

Upon assembly, each of the elements shown in FIG. 9C is interconnected as shown to form a unitary structure. An end portion 471 of the tube 448 includes an annular retaining groove 472 and extends through the wafer 470 and a corresponding plate (not shown) adjacent circumferential edge 474 which has a configuration similar to plate 438 closing the end of the cylindrical member 432. A retaining spring 476 of conventional construction is then positioned about that tubular portion 470 to engage the groove 472 to retain the tube 448 and its atached elements, and the cover adjacent edge 474 (not shown) in a rigid configuration. The whole assembly is then attached via the shaft 414 by inserting the shaft 414 through the tube 448 to have its threaded end engage the threaded opening 442. Naturally, the tube 446 will be of such a diameter as to closely engage the shaft 414.

It should be understood, that upon assembly, the timing strip 434 is positioned in alignment with the rate sensor 154 to define a reference angular position of the rotating structure. Also, as more particularly shown in FIG. 9B, a plurality of terminals 478 extend through the end plate 438 to form output terminals for signals from the transducers 154, 155, 156, 156', 157, and 157' and two ground terminals (the outputs of 156 and 156' are coupled to form one output as are 157 and 157'). Within the cylinder 432, lead wires couple the appropriate terminals 478 to provide the sensor signals from the appropriate sensor, and lead wires 480 are then coupled to extend within the hollow motor shaft 414 where they are connected to the slip rings 426 at an opposite end of said shaft. In this manner, the transducer signals are provided for processing through the slip-rings 426 as was previously mentioned.

In order to provide balancing of the rotating structure following its assembly, the cover 438 as well as the similar cover engaging the opposite edge 474 of the cylinder 432, each have annular channels 444. This channel is used to provide balancing of the device by retaining solder or other weighting matter at the appropriate position in the annular channel so that the rotating structure is balanced. Such material can be added to both plates 438 in order to achieve the best possible balance for providing optimum operation of the rotating structure by eliminating vibrations caused by rotation which would otherwise interfere with the transducer signals.

As will be appreciated from the above discussion, the present assembly provides a compact and less complex structure enabling miniaturization of the multifunction rotating assembly. The particular elements used to mount the sensors and the cylindrical structure used to enclose and form the housing enable a compact unit to be formed which is sealed against contaminants and provides protection against electromagnetic interference. In addition, the structure is such as to allow easy mounting of the sensor elements in the appropriate angular relationship yet provide sturdy and highly reliable operation for long periods of time, as well as enabling and facilitating easy disassembly for repair or replacement of defective parts. The completed assembly 438 may be simply threaded onto or off of the motor shaft to accomplish this repair, thereby leading to reduced costs of the assembly. Also, the assembly may be made of lightweight elements such as aluminum to further improve the versatility of the device.

Figure 10:
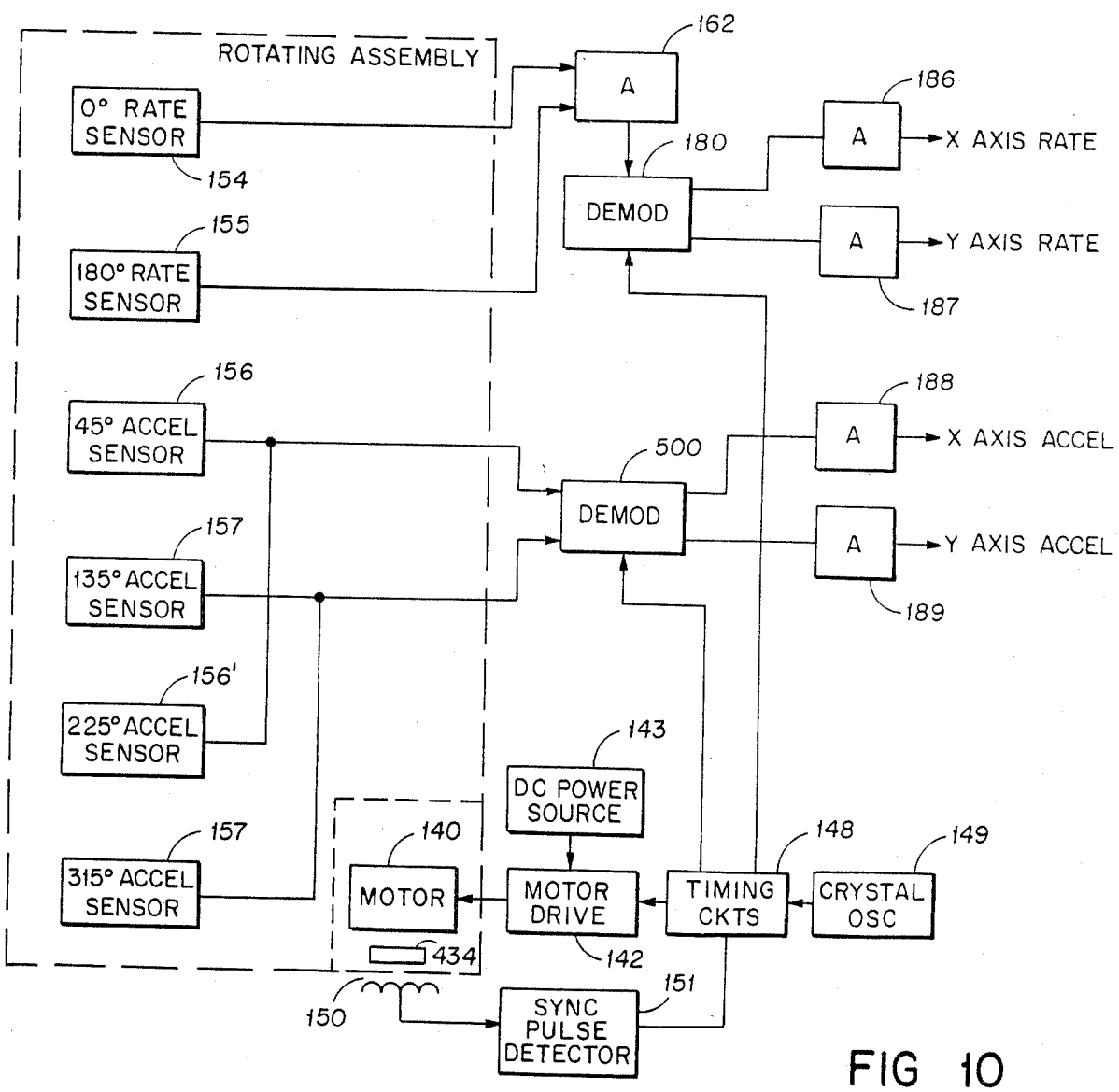
FIG. 10 is an embodiment of a demodulator assembly in accordance with the present invention for obtaining improved two-axis acceleration outputs without the need for a phase shift network.

Referring now to FIG. 10, there is shown a signal demodulating system which is used for converting the outputs of the piezoelectric sensors to the dual axis rate and acceleration signals. The demodulation system includes a configuration similar to that shown in FIG. 4 and accordingly will easily be understood in connection with the detailed description of the operation of FIG. 4. In those instances where the elements are similar, the same reference numerals have been used to refer to those elements. In addition, the same detailed description with respect to the operation and cooperation of those elements is applicable. Only those differences relating to those aspects of the present invention different from the previous description will be described in great detail below in order to further understand the features of the present invention.

In particular, the system of FIG. 10 shows the basic transducer assembly 400 which includes the rate sensors 154 and 155 and the four acceleration sensors 156, 156', 157, 157'. As was noted in connection with FIG. 9, the acceleration sensors 156, 156' are associated as a pair and spaced 180° apart from one another and 90° from the adjacent sensors 157, 157'. The acceleration sensors 157, 157' are likewise associated as a pair and angularly spaced 180° apart from one another and 90° from the adjacent sensors 156, 156' about the hub of the rotating transducer assembly. The output of each of the associated pairs of sensors are provided through leads to slip-rings on the motor shaft which in turn couple those outputs to the processing circuitry. Likewise, the outputs from the rate sensors 154, 155 are coupled through leads to slip-rings which also provide their output to the processing circuitry.

The relative positions of the rate sensors and the acceleration sensors with respect to one another on the rotating structure are shown in the drawing as the 0°, 180°, 45°, 135°, 225°, and 315° angles representing the angular position of those sensors about the hub structure of the integrated assembly 400, with the rate sensor serving as the 0° (360°) angular position on the hub assembly. As shown in FIG. 10, the outputs from the sensors 156, 56' are coupled to one another and provide a single output coupled via the slip-rings to one input of a demodulator 500. Likewise, the outputs from the sensors 157 and 157' are coupled to provide a single output coupled via slip-rings to a second input of the demodulator 500. The combined outputs of each sensor pair are thus provided as one sensor signal for demodulation as will be described in greater detail below. It should be recognized, however, that the sensor signals are coupled to form the single output in such a manner that the same polarities are coupled for sensor polarities facing in the same direction.

This combination of signals from the sensor pairs, spaced by 180°, provides an improved acceleration signal by cancelling error signals which appear in the sensor signals due to sensor mounting, construction, and rotation. Those error signals subtract from one another due to their 180° mounting with respect to one another. Although this particular coupling of the outputs of each associated pair is preferable in accordance with the present invention, the integrated transducer assembly 400 could also be formed with only the two sensors 156 and 157 having their outputs demodulated in the demodulator 500. This construction would then result in a device with a sensor configuration similar to that described with reference to FIG. 1, but still having reduced complexity and other benefits as described in connection with the device of FIG. 9.

Figure 14:
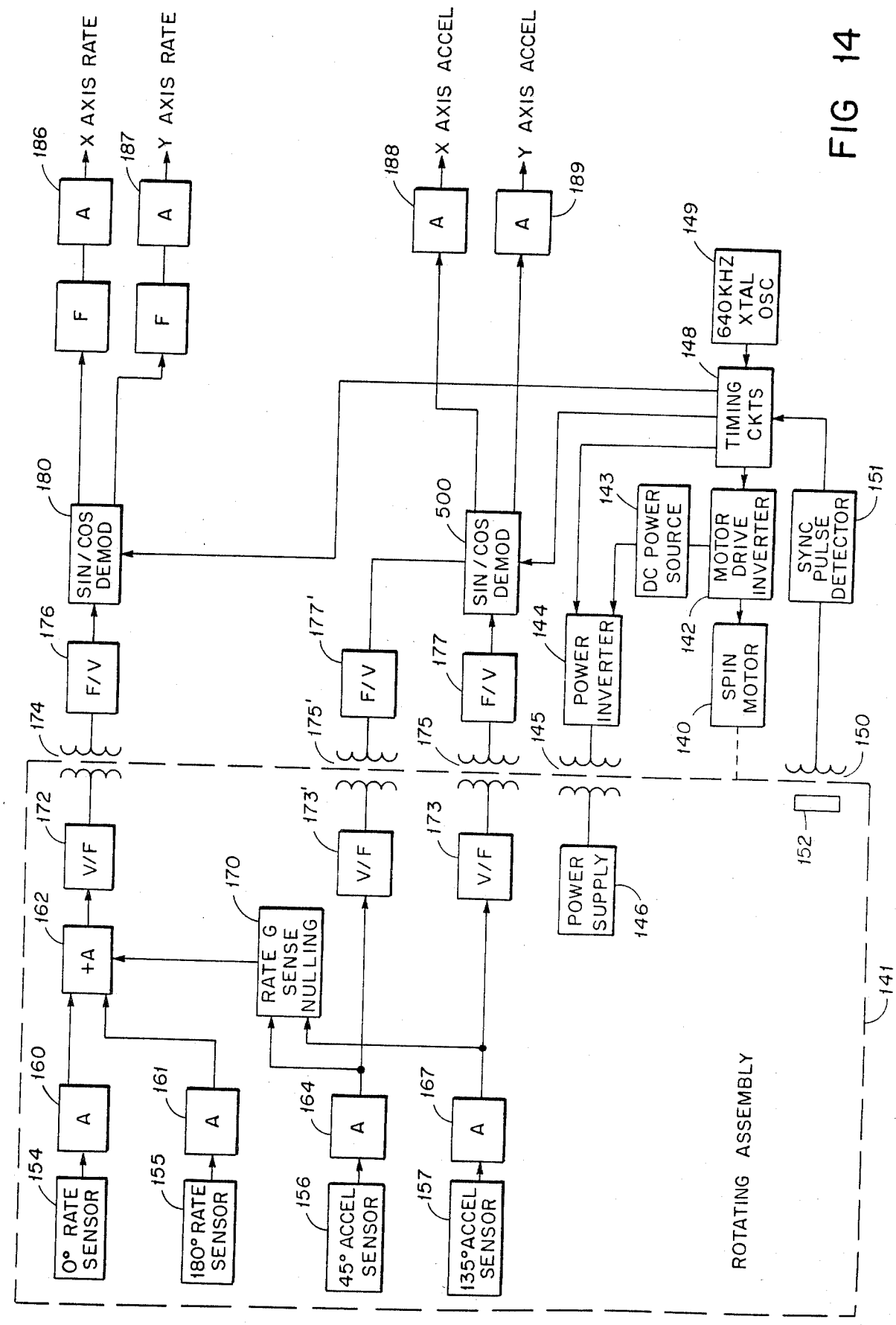
FIG. 14 is a schematic diagram of an alternative implementation of the system shown in FIG. 4 so that the demodulation of FIG. 10 can be employed.

In accordance with the present invention, the output from the rate transducers are individually coupled as the inputs to a demodulator 180 and thereafter have their outputs coupled through amplifiers 186, 187 to provide X axis rate information and Y axis rate information to vehicle control systems. In a manner similar to that described with reference to FIG. 14, the demodulated acceleration signals are likewise coupled through amplifiers 188 and 189, respectively, to provide X axis acceleration signals and Y axis acceleration signals for use by vehicle control systems. It should be particularly noted, that with use of the demodulator 500, the need for the lowpass filters in the outputs of the demodulators and the phase shifting of the acceleration signals from the sensors 156 and 157 have been reduced. Accordingly, the structure is able to provide for wideband operation. The demodulation configuration also reduces cross-axis coupling effects as has been previously described.

As was described in connection with FIG. 4, the driving and demodulating system includes a power supply 143, a motor drive inverter 142, a motor 140 which drives the rotating assembly 400, and a timing circuit 148 which accurately controls the rotation of the rotating assembly and the demodulation through demodulators 500 and 180 in accordance with the angular position of the rotating assembly. The detection of the assembly position is provided by a sync pulse detector circuit 151 which senses the position of the timing mark 152 on the cover of the integrated assembly 400 to provide a sync signal to the timing circuit 148 in a manner similar to that described with respect to FIGS. 1 and 4. Likewise, the crystal oscillator 149 provides an accurate and stable timing source which is coupled through the timing circuits 148 to control the operation of each of the elements in the system also as was previously described.

Figure 11:
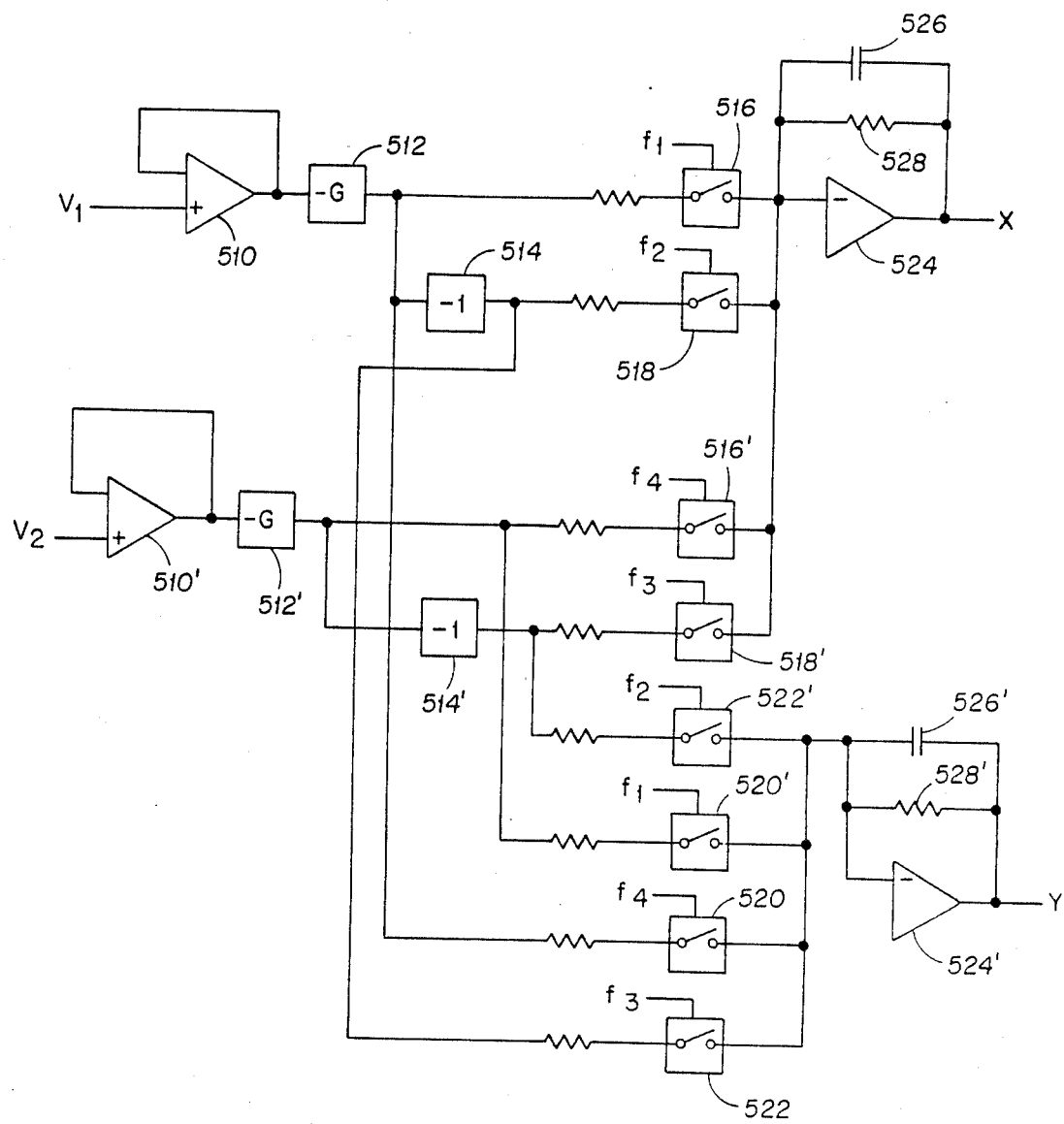
FIG. 11 is a more detailed schematic diagram of the demodulator in the system in FIG. 10.

Referring now to FIG. 11, there is shown the demodulation circuit 500 which is used in the circuit of FIG. 10. In accordance with demodulator 500 of FIG. 11, the two sensor signals from sensors 156 and 157 (after adding with the other sensor of the pair) are provided as the $v_1$, $v_2$ signal inputs representing acceleration. The circuit 500 then demodulates and combines the two sensor signals, cancels the $2\omega_s$ induced bias terms and provides two axes of linear acceleration as the outputs represented by X and Y. The cross-axis coupling is eliminated because the phase shift circuit used in connection with that shown in FIG. 4 is not employed. In addition, the demodulated signal contains much less ripple than if the one-phase input scheme of FIG. 4 were employed. The output filtering can thereby be reduced to provide an improved bandwidth.

Referring again to FIG. 11, the input signals $v_1$ and $v_2$ from the sensors are coupled to the positive input of a conventional operational amplifier 510 having its output coupled as feedback to the negative input of that amplifier. For purposes of explanation in the present embodiment of FIG. 11, the prime designations of the numeral will represent identical elements in both circuits such that only a description of one of the circuits is needed for an understanding of the two-phase demodulation. The output from operational amplifier 510 is coupled to a block labeled -G which represents inversion and gain. The blocks 512 and 512' allow adjustment of the gain applied to the signals $v_1$ and $v_2$ such that the effective sensitivity of the two sensors 156 and 157 are equal. The output from block 512 is coupled as one input to an analog switch 516 and through an analog inverter 514 as an input to analog switch 518. The output from 512 is also coupled as an input to analog switch 520 while the output from inverter 514 is coupled as input to an analog switch 522. A similar connection is made with respect to the output from 512' and 514' to each of the analog switches 516', 518', 522' and 520'. Outputs from analog switches 516 and 518 are coupled in common with the outputs from analog switches 516' and 518' and to the negative input of operational amplifier 524 having feedback from its output through a parallel resistor/capacitor combination 526 and 528 or other means such as incremental pulse feedback. In a similar manner, the output from switches 520, 522 and 520', 522' are coupled in common to the negative input of operational amplifier 524' which has its output coupled as feedback through the parallel resistor capacitor combination 526', 528' or other feedback means.

In view of the combination of the switch signals in the inverting input of the inverting amplifiers 524, 524', the operational amplifiers act as an inverting lowpass filter/amplifier for the signals. This results in two-axis output of the two-phase signals provided as $v_1$ and $v_2$ in the input. For an understanding of the mathematics of the present technique, reference is made to FIG. 12 wherein the orientation of the sensor with respect to the X and Y axis acceleration and the rotation of the hub is schematically shown. In that illustration, the hub is shown rotating at a rate $\omega_s$ and the sensors are shown oriented at 90° and represented by the $v_1$ and $v_2$ designations. The component of acceleration in the X direction is shown as $A_x$ and the component of accleration in the Y direction is shown as $A_y$. The schematic illustration is shown to represent the position of the rotating assembly at $\omega t = 0$.

Figure 13A:
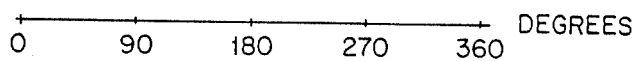
FIGS. 13A–13E are graphs showing the switching signals used in the demodulator of FIG. 11.
Figure 13B:
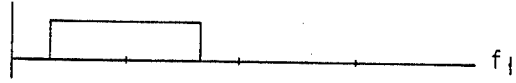
Figure 13C:
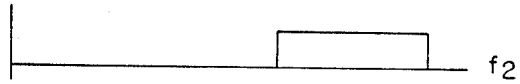
Figure 13D:
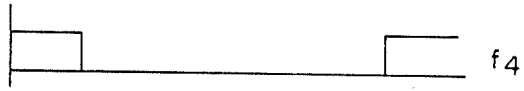
Figure 13E:
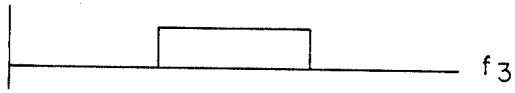
Figure 13F:
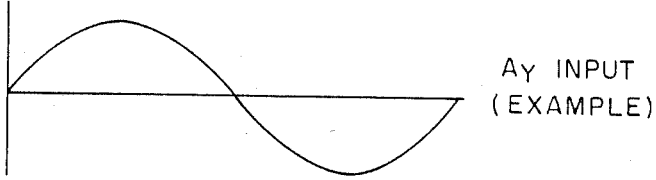
FIGS. 13F and 13G are graphs showing the transducer signals from the rotating assembly of FIG. 10.
Figure 13G:
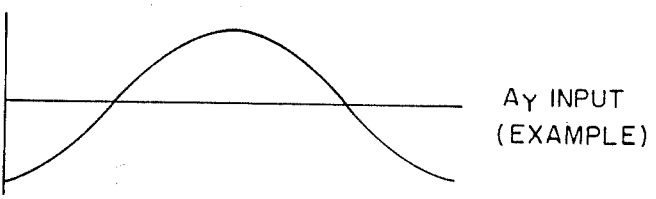

As was noted above, the switches 516, 518, 520 and 522, as well as their related prime designations, are analog switches of a conventional type such as a 4066. The switches are operated to open and close in response to a modified squarewave which is designated as $f_1$ through $f_4$ shown in FIG. 13 with respect to the angular position of the sensor. More specifically, in FIG. 13A, there is shown the relative angular position of the sensor with respect to the timing sync from 0° to 360°. Each of the waveforms of FIGS. 13B, 13C, 13D and 13E represent the demodulator switching waveforms applied to a control terminal of the analog switches to control the opening and closing of the switch contacts as the assembly rotates. Specifically, the $f_1$ function of FIG. 13B drives the switches 516 and 520'; the $f_2$ waveform of FIG. 13C drives the switches 518 and 522'; the $f_3$ waveform of FIG. 13E drives the switches 518' and 522; and the $f_4$ waveform of FIG. 13D drives the switches 520 and 516'.

Each of the waveforms of FIGS. 13B–13E are modified squarewaves having a digital 1 or 0 value represented by that positive portion of the waveform shown in FIGS. 13A–13E. As a result, during angular rotation of the assembly 412, the presence of each waveform producing a digital 1 value closes the associated switch contacts. During the absence of that waveform during the remainder of that angular rotation, the associated switch contacts are open. As can be seen, each squarewave of FIGS. 13B-13E has a period which is centered on one of the 90°, 180°, 270° and 360° (0°) marks of the angular rotation of assembly 412 and has a period of 120°. The combined switching function produced by the waveforms of FIGS. 13B-13E produce the switching necessary in the analog switches to demodulate the sensor inputs $v_1$ and $v_2$ shown in FIGS. 13F and 13G. The resulting output from operational amplifiers 524 and 524' then represent the demodulated X and Y axis acceleration, $A_x$ and $A_y$, respectively.

Although the waveforms illustrated in FIGS. 13B-13E have been described with reference to the operation of the switches in FIG. 11, it should be appreciated that the same switching waveforms as were used in connection with the control of FIG. 7 could be employed to produce a more accurate demodulation. Specifically, the waveform f1 in FIG. 8 could be employed as the $f_1$ waveform of FIG. 13B; the waveform f2 of FIG. 8 could be employed as the $f_2$ waveform of FIG. 13C; the waveform f3 of FIG. 8 could be employed as the $f_3$ waveform of FIG. 13E; and the waveform f4 of FIG. 8 could be employed as the $f_4$ waveform of FIG. 13D. The generation of those waveforms f1-f4 of FIG. 8, and their application to obtain demodulation, was explained in great detail with respect to FIG. 7 thereby rendering a further detailed explanation unnecessary for an understanding of the present invention. In particular, however, it should be noted that the outputs from element 346 in FIG. 7B would be provided as the four outputs representing the $f_1$, $f_2$, $f_3$, and $f_4$ waveforms, respectively, for driving the appropriate analog switches of FIG. 11 in lieu of the switches shown in FIG. 7A.

In order to more easily understand the results achieved by using the demodulator 500, the following analysis will show the approximate mathematical operation of the system with respect to confirming the improvement in bandwidth and cancellation of the $2\omega_s$ bias terms. The analysis will also show that the demodulated signal contains much less ripple than if the one-phase input approach of FIG. 4 were used, and therefore allows output filtering to be substantially reduced. The demodulator has the effect of rectifying the two signals $v_1$ and $v_2$ which are 90° apart and adding them together. The different phasing of $v_1$ and $v_2$ cause the sum to have much less ripple as a percentage of total output than if single phase information were used.

Figure 12:
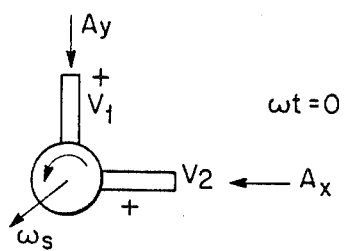
FIG. 12 is a pictorial illustration showing the multiple sensors and the relative axis and transducer signals in a rotating transducer assembly.

Referring briefly to FIG. 12 for the nomenclature used in connection with the definition of the sensor signals, it can be seen that the signal $v_1$ produced by the first sensor is:

$$v_1 = K_1 A_y \sin \omega_s t + K_1 A_x \cos \omega_s t \qquad (19)$$

and the signal representing the second sensor signal $v_2$ is given as:

$$v_2 = K_2 A_x \sin \omega_s t - K_2 A_y \cos \omega_s t \qquad (20)$$

where $A_x$ is the component of acceleration in the X direction, $A_y$ is the component of acceleration in the Y direction, $\omega_s$ is the rotation speed of the sensor, and $K_1$ and $K_2$ are constants.

Now, for the constant acceleration case, along the Y axis:

$$v_1 = K_1 A_y \sin \omega_s t \qquad (21)$$

$$v_2 = -K_2 A_y \cos \omega_s t \qquad (22)$$

Likewise, along the X axis:

$$v_1 = K_1 A_x \cos \omega_s t \qquad (23)$$

$$v_2 = K_2 A_x \sin \omega_s t \qquad (24)$$

Now, assuming that there is no phase shift in the electronics, the demodulator function needed to demodulate $v_1$ would be:

$$v_x = v_1 \cos \omega_s t + v_2 \sin \omega_s t \qquad (25)$$

$$v_y = v_1 \sin \omega_s t - v_2 \cos \omega_s t \qquad (26)$$

While the demodulator function actually implemented only approximates that shown in equations (25) and (26), those skilled in the art can recognize through the analysis that the implemented demoduator does approximate the ideal sinusoidal multiplier. The gain term for the DC component is somewhat lower than the ideal. The rejection of all even harmonics is retained, while the rejection of third harmonics and its multiples is retained. The actual demodulator 500 puts out some higher frequency ripple terms not given in the following simplified analysis. The waveform used to drive the demodulator switches (516, 518, 520, 522 etc.) determine the closeness of the sinusoidal approximation. The drive waveforms $f_1$-$f_4$ in FIGS. 13B-E are sufficient for many applications, while the waveforms $f_1$-$f_4$ in FIG. 8 improve the approximation further.

Using equations (25) and (26), the demodulator output would then be:

$$v_x = (K_1 A_y \sin \omega_s t + K_1 A_x \cos \omega_s t) \cos \omega_s t + (K_2 A_x \sin \omega_s t - K_2 A_y \cos \omega_s t) \sin \omega_s t \qquad (27)$$

and $$v_y = (K_1 A_y \sin \omega_s t + K_1 A_x \cos \omega_s t) \sin \omega_s t - (K_2 A_x \sin \omega_s t - K_2 A_y \cos \omega_s t) \cos \omega_s t \qquad (28)$$

Expanding equation (27), the $v_x$ output is:

$$v_x = K_1 A_x \cos^2 \omega_s t + K_2 A_x \sin^2 \omega_s t + K_1 A_y \sin \omega_s t \cos \omega_s t - K_2 A_y \cos \omega_s t \sin \omega_s t \qquad (29)$$

Now, using sine and cosine functions wherein:

$$\sin^2 \alpha = \tfrac{1}{2}(1 - \cos 2\alpha) \qquad (30)$$

$$\cos^2 \alpha = \tfrac{1}{2}(1 + \cos 2\alpha) \qquad (31)$$

$$\sin\alpha\cos\alpha = \tfrac{1}{2} \sin 2\alpha \qquad (32)$$

The output $v_x$ becomes:

$$v_x = \frac{K_1 A_x}{2} + \frac{K_1 A_x}{2} \cos 2\omega_s t + \frac{K_2 A_x}{2} - \frac{K_2 A_x}{2} \cos 2\omega_s t + \frac{(K_1 A_y - K_2 A_y)}{2} \sin \omega_s t \qquad (33)$$

Combining terms, the resulting $v_x$ output is:

$$v_x = \frac{A_x}{2}(K_1 + K_2) + \frac{A_x}{2}(K_1 - K_2)\cos 2\omega_s t + \frac{A_y}{2}(K_1 - K_2)\sin 2\omega_s t \quad (34)$$

Now since $K_1$ can be controlled to equal, or be approximately equal to $K_2$ by system design, the ripple terms can be greatly attenuated, thereby resulting in an output $v_x$ which is approximately:

$$v_x = \frac{A_x}{2}(K_1 + K_2) \quad (35)$$

This result implies that lowpass filtering of the output can be reduced, thereby improving the output bandwidth and response of the system.

Now, in order to check for suppression of $2\omega_s$ vibrations, let $\omega_s t$ equal $\alpha$, $A_y$ equal zero, and $A_x$ equal $A_x(\sin 2\alpha)$. The modulated signal for $v_1$ and $v_2$ then become:

$$v_a = K_1 A_x \sin 2\alpha \cos \alpha \quad (36)$$

$$v_2 = K_2 A_x \sin \alpha \sin 2\alpha \quad (37)$$

Using the following sine and cosine relationships, the equation can then be expanded:

$$\sin \alpha \cos \beta = \tfrac{1}{2} \sin(\alpha+\beta) + \tfrac{1}{2}\sin(\alpha-\beta) \quad (38)$$

$$\sin \alpha \cos \beta = \tfrac{1}{2} \cos(\alpha-\beta) - \tfrac{1}{2}\cos(\alpha+\beta) \quad (39)$$

This expansion results in the following equations for $v_1$ and $v_2$:

$$v_1 = \frac{K_1 A_x}{2}[\sin 3\alpha + \sin \alpha] \quad (40)$$

$$v_2 = \frac{K_2 A_x}{2}[\cos \alpha - \cos 3\alpha] \quad (41)$$

As a result, using the values for $v_x$ and $v_y$ as set forth in equations (25) and (26) above, the demodulated output signals $v_x$ and $v_y$ become:

$$v_x = \frac{K_1 A_x}{2}(\sin 3\alpha + \sin \alpha)\cos \alpha + \frac{K_2 A_x}{2}(\cos \alpha - \cos 3\alpha)\sin \alpha \quad (42)$$

$$v_y = \frac{K_1 A_x}{2}(\sin 3\alpha + \sin \alpha)\sin \alpha - \frac{K_2 A_x}{2}(\cos \alpha - \cos 3\alpha)\cos \alpha \quad (43)$$

At this point, it should be recognized that the $3\alpha$ terms do not demodulate into bias outputs so they can be dropped from the analysis, and their effect in contributing to output ripple has been found to be insufficient to affect the improvement in overall system operation. Thus, without the $3\alpha$ terms, the equations for $v_x$ and $v_y$ now become:

$$v_x = \frac{K_1 A_x}{2}\sin \alpha \cos \alpha + \frac{K_2 A_x}{2}\sin \alpha \cos \alpha \quad (44)$$

$$v_y = \frac{K_1 A_x}{2}(\sin^2 \alpha) - \frac{K_2 A_x}{2}(\cos^2 \alpha) \quad (45)$$

Expanding equation (44) results in the following equation for $v_x$:

$$v_x = \frac{K_1 A_x}{2}\left(\tfrac{1}{2}\sin 2\alpha\right) + \frac{K_2 A_x}{2}\left(\tfrac{1}{2}\sin 2\alpha\right) \quad (46)$$

$$v_x = \frac{A_x}{4}(K_1 + K_2)\sin 2\omega_s t$$

Now, doing the same for $v_y$ results in the following:

$$v_y = \frac{K_1 A_x}{2}\left(\frac{1-\cos 2\alpha}{2}\right) - \frac{K_2 A_x}{2}\left(\frac{1+\cos 2\alpha}{2}\right) \quad (47)$$

Rearranging then gives a value for $v_y$ as follows:

$$v_y = \frac{A_x}{4}(K_1 - K_2) - \frac{A_x}{4}(K_1 + K_2)\cos 2\omega_s t \quad (48)$$

Since the object is to adjust $K_1$ so that it equals $K_2$, the bias term $v_y A_x/4 (K_1-K_2)$ goes to zero, and only ripple occurs on the outputs. Thus, the values for $v_x$ and $v_y$ without the $3\alpha$ terms become, with an input of $A_x \sin 2\omega_s t$:

$$v_{x1} = \frac{A_x}{4}(K_1 + K_2)\sin 2\omega_s t \quad (49)$$

$$= \frac{K_1 A_x}{2}\sin 2\omega_s t$$

$$v_{y1} = -\frac{A_x}{4}(K_1 + K_2)\cos 2\omega_s t \quad (50)$$

$$= -\frac{A_x K_1}{2}\cos 2\omega_s t$$

Now, returning to the terms including $3\alpha$ which were dropped, the same were ripple terms. Letting $K_1 = K_2 = K$, those terms then result in $$v_{x2} = \frac{K_1 A_x}{2}(\sin 3\alpha \cos \alpha - \cos 3\alpha \sin \alpha) \quad (51)$$

$$v_{y2} = \frac{K_1 A_x}{2}(\sin 3\alpha \sin \alpha + \cos 3\alpha \cos \alpha) \quad (52)$$

Expanding the $v_{x2}$ term results in:

$$v_{x2} = \quad (53)$$

$$\frac{K_1 A_x}{2}\left[\left(\tfrac{1}{2}\sin 4\alpha + \tfrac{1}{2}\sin 2\alpha - \frac{(\sin 4\alpha + \sin(-2\alpha))}{2}\right)\right]$$

$$= \frac{K_1 A_x}{2}(\sin 2\omega_s t)$$

Similarly, expansion of the $v_{y2}$ term results in:

$$v_{y2} = \frac{K_1 A_x}{2}\left[\tfrac{1}{2}\cos 2\alpha - \tfrac{1}{2}\cos 4\alpha + \tfrac{1}{2}\cos 2\alpha + \tfrac{1}{2}\cos 4\alpha\right] \quad (54)$$

$$= \frac{K_1 A_x}{2}\cos 2\omega_s t$$

It will be appreciated now that the ripple terms represented by equations (49) and (50) must be added to the ripple terms represented by equations (53) and (54) to give the total ripple at the output. Thus, the output $v_x$ becomes:

$$v_x = v_{x1} + v_{x2} \tag{55}$$

$$v_x = K_1 A_x \sin 2\omega_s t$$

and the output $v_y$ becomes:

$$v_y = v_{y1} + v_{y2} = 0 \tag{56}$$

It can thus be seen that there is no ripple in the Y output.

It will be seen from the above that assuming a twice spin frequency vibration along the X axis in the analysis made by equations (36)–(48) there is a suppression of $2\omega_s$ vibrations resulting in no DC bias terms generated if $K_1$ equals $K_2$. As shown, the $2\omega_s$ (ripple) output is only present on the X axis output, with no ripple being present on the Y axis output. It should be specifically noted that if the second transducers 156′ and 157′ were not present and added to the signals from transducers 156 and 157, an output error proportional to the $2\omega_s$ amplitude would be generated.

Now, in order to consider the frequency response of the system using the demodulator 500 of the present invention, let the input acceleration be sinusoidal along the $A_x$ axis, $A = A_x \sin \omega t = A_x \sin \beta$ and for convenient notation $\alpha = \omega_s t$. Then the signals $v_1$ and $v_2$ can be written as follows:

$$v_1 = K_1 A_x \sin\beta \cos\alpha = \frac{K_1 A_x}{2}[\sin(\alpha+\beta) - \sin(\alpha-\beta)] \tag{57}$$

$$v_2 = K_2 A_x \sin\beta \sin\alpha = \frac{K_2 A_x}{2}[\cos(\alpha-\beta) - \cos(\alpha+\beta)] \tag{58}$$

If the response of the amplifiers is flat (out to $\alpha \pm \beta$) the above signals go to the demodulator and the X demodulator output becomes:

$$v_x = v_1 \cos\alpha + v_2 \sin\alpha \tag{59}$$

$$= \frac{K_1 A_x}{2}[\sin(\alpha+\beta)\cos\alpha - \sin(\alpha-\beta)\cos\alpha] +$$

$$\frac{K_2 A_x}{2}[\cos(\alpha-\beta)\sin\alpha - \cos(\alpha+\beta)\sin\alpha]$$

$$= \frac{K_1 A_x}{2}\left[\frac{1}{2}(\sin(2\alpha+\beta) + \sin\beta) - \right.$$

$$\left.\frac{1}{2}(\sin(2\alpha-\beta) + \sin(-\beta))\right] +$$

$$\frac{K_2 A_x}{2}\left[\frac{1}{2}(\sin(2\alpha-\beta) + \sin\beta) - \right.$$

$$\left.\frac{1}{2}(\sin(2\alpha+\beta) + \sin(-\beta))\right]$$

$$= (K_1 - K_2)\frac{A_x}{4}\sin(2\alpha+\beta) +$$

-continued $$(K_2 - K_1)\frac{A_x}{4}\sin(2\alpha - \beta) + \frac{K_1 A_x}{4}[\sin\beta + \sin\beta] +$$

$$\frac{K_2 A_x}{4}[\sin\beta + \sin\beta]$$

Now for $K_1 = K_2$, the above value for $v_x$ becomes:

$$v_x = K_1 A_x \sin\beta = K_1 A_x \sin \omega t \tag{60}$$

It should be specifically noted that this term for $v_x$ as set forth in equation (60) contains no ripple and is the desired result. Now turning back to the demodulator output for the Y axis, the $v_y$ output becomes:

$$v_y = v_1 \sin\alpha - v_2 \cos\alpha \tag{61}$$

$$= \frac{K_1 A_x}{2}[\sin\alpha \sin(\alpha+\beta) - \sin\alpha \sin(\alpha+\beta)] -$$

$$\frac{K_2 A_x}{2}[\cos\alpha \cos(\alpha-\beta) - \cos\alpha \cos(\alpha+\beta)]$$

$$= \frac{K_1 A_x}{4}[\cos(+\beta) - \cos(2\alpha+\beta) -$$

$$(\cos(+\beta) - \cos(2\alpha+\beta))] -$$

$$\frac{K_2 A_x}{4}[\cos\beta + \cos(2\alpha-\beta) - (\cos(+\beta) + \cos(2\alpha+\beta))]$$

$$= -\frac{K_2 A_x}{4}[\cos(2\alpha-\beta) - \cos(2\alpha+\beta)]$$

As will be appreciated, the demodulator output for $v_y$ is ripple only. Thus, for an input $A_x \sin \omega t$, the $v_x$ output becomes:

$$v_x = \frac{(K_1 + K_2)}{2} A_x \sin \omega t \tag{62}$$

which is the signal, and the $v_y$ output becomes:

$$v_y = -\frac{K_2 A_x}{4}[\cos(2\omega_s t - \omega t) - \cos(2\omega_s t + \omega t)] \tag{63}$$

which is ripple. It can thus be seen that the output of $v_y$ is ripple only and there is no $\omega_s t$ component or DC component. The only ripple signal is that of modulated ripple at $2\omega_s t$ which is acceptable for sensor operation.

Figure 15A:
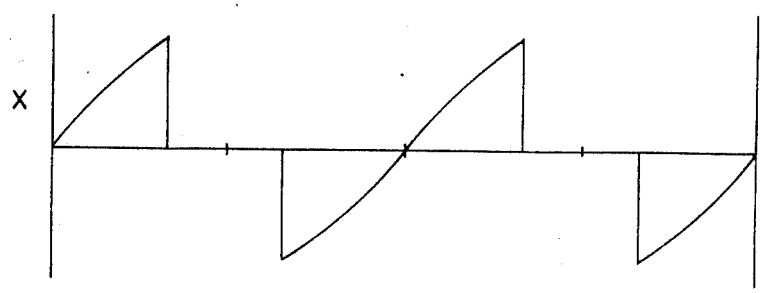
FIGS. 15A–15D are graphs depicting the two-axis ripple improvements over prior used techniques.
Figure 15B:
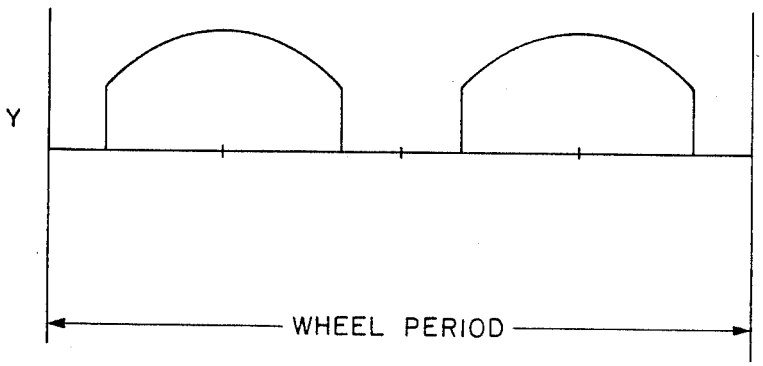
Figure 15C:
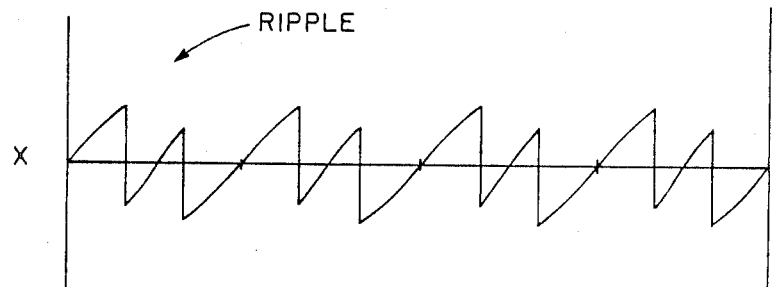
Figure 15D:
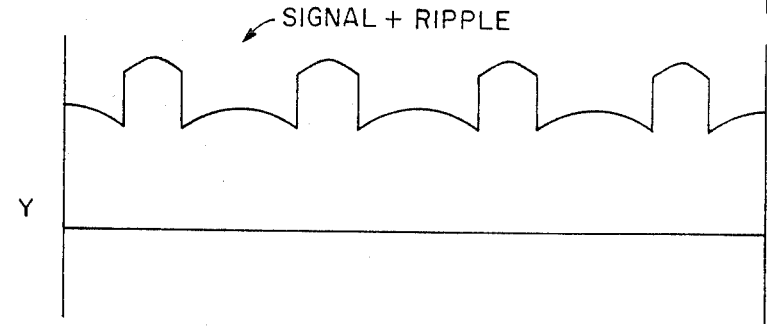

The benefits of using the above-described techniques can best be appreciated by reference to FIGS. 15A–D. FIGS. 15A–D illustrate the X and Y acceleration outputs before filtering for an $A_y$ signal input such as that shown in FIG. 13. FIG. 15A shows the cross-axis ripple before filtering in the X axis output using the noted one-phase demodulation technique described with reference to FIG. 4, while FIG. 15B shows the rippled Y axis output signal before filtering using the same one-phase demodulation technique. FIG. 15C shows the cross-axis ripple before filtering in the X axis output using the demodulation technique of FIGS. 10 and 11 while FIG. 15D shows the rippled Y axis output signal using the FIGS. 10 and 11 demodulation technique. Since all diagrams 15A–15D are to the same scale, it can be seen that the net ripple output of FIG. 15C is of reduced magnitude from that of FIG. 15A while the net Y output of FIG. 15D is of reduced magnitude ripple with a lower ratio of ripple to DC signal.

Although the invention has been described with respect to the specific embodiments of FIGS. 9 and 10 and the demodulator of FIG. 11, it will be apparent that other modifications could be made to provide improved bandwidth and reduced ripple. Specifically, the sensor structure of FIG. 1 could be employed to obtain the same improved acceleration bandwidth output with only minor modifications to that structure. In particular, by reference to FIG. 14, the phase shifter 165 and adder 166 of FIG. 4 can be eliminated and a voltage-to-frequency converter 173' coupled to the amplifier 164 to provide an independent sensor signal from sensor 156. This sensor signal can be coupled through transformer 175' to a frequency-to-voltage converter 177' having its output coupled as a second input to the demodulator 500. In this configuration, the output of sensor 157 through amplifier 167 is also directly coupled to voltage-to-frequency converter 173 for coupling to the demodulator 500 thorough frequency-to-voltage converter 177. In all other aspects, the operation of the system of FIG. 14, except for the demodulation and coupling of the separate signals, would be the same as that described with respect to FIG. 4 above.

It should be further appreciated that the same technique used to obtain improvement in the acceleration outputs could be employed with respect to the rate outputs. Specifically, a second set of rate transducers could be employed and located angularly spaced 90° from the illustrated rate transducers 154 and 155. The use of the two sets of rate transducers in a manner similar to the acceleration transducers will allow cancellation of some known vibration effects. In this instance, the two sets of rate signals would be demodulated using the demodulator 500 described with reference to FIG. 11 in lieu of demodulator 180. The resulting structure would provide increased signal energy from the second rate transducer, reduce bias due to cancellation of unwanted signals, reduce ripple output, and improve bandwidth by reducing required filtering.

In view of the above, it can be seen that an integrated transducer assembly is set forth which allows improved construction and reduced complexity for providing multifunction sensor signals relating to rate and acceleration. Less expensive construction methods and a reduction in the number of elements used to form the circuits are facilitated by the assembly and includes a mounting of sensor pairs to produce a common output for the acceleration sensors. The resulting structure allows coupling of independent sensor signals without cross-axis coupling, and the subsequent demodulation in the manner described provides reduced ripple and eliminates the need for lowpass filters which severely restrict the bandwidth of the two-axis signals. As a result, the transducer assembly can be used in a variety of environments that would otherwise not be possible. All of these are features which are not shown or suggested by the prior art.

While the system has been described with reference to particular elements, it is obvious that other equivalent devices may be used. Obviously, many other modifications and variations of the present invention are possible in light of the above teachings. It is therefore to be understood that within the scope of the appended claims, the invention may be practiced otherwise than as specifically described.

What is claimed is:

1. A transducer and signal demodulating system comprising:
    at least one first acceleration sensor and at least one second acceleration sensor mounted for rotation about a common axis, said at least one first and said at least one second sensor being angularly spaced by an angle of 90° with respect to one another about said axis;
    means for providing a first signal from said at least one first sensor and means for providing a second signal from said at least one second sensor;
    means for receiving and varying the amplitude of each of said first and second signals for providing first and second transducer signals, respectively;
    means coupled to said first transducer signal for providing an inverted first transducer signal and means coupled to said second transducer signal for providing an inverted second transducer signal;
    first and second switch means for providing first and second demodulation outputs, each of said first and second switch means including a first switch having an input and output with the input of said first switch being coupled to receive said first transducer signal, a second switch having an input and an output with the input of said second switch being coupled to receive said inverted first transducer signal, a third switch having an input and an output with the input of said third switch being coupled to receive the second transducer signal, and a fourth switch having an input and an output with the input of said fourth switch being coupled to receive the inverted second transducer signal, the output of each of said first, second, third, and fourth switches of said first switch means being coupled in common to provide a first demodulation output and the output of each said first, second, third and fourth switches of said second switch means being coupled in common to provide a second demodulation output, each of said switches having a means for intermittently coupling the input of each switch to its output in response to a switching signal, wherein each of said demodulation outputs represents acceleration in an axis perpendicular to one another and to said common axis.

2. The system of claim 1 further comprising first and second operational amplifiers, each having an input coupled to receive a different one of the demodulation outputs and provide an output thereof.

3. The system of claim 1 wherein each of said first, second, third and fourth switches of the first switch means are driven by the same switching signal as the first, second, third, and fourth switches, respectively, of the second switch means.

4. A transducer and signal demodulating system comprising:
    at least one first acceleration sensor and at least one second acceleration sensor mounted for rotation about a common axis, said at least one first and said at least one second sensor being angularly spaced by an angle of 90° with respect to one another about said axis;
    means for providing a first signal from said at least one first sensor and means for providing a second signal from said at least one second sensor;
    means for receiving and varying the amplitude of each of said first and second signals for providing first and second transducer signals, respectively;

means coupled to said first transducer signal for providing an inverted first transducer signal and means coupled to said second transducer signal for providing an inverted second transducer signal;

first and second switch means for providing first and second demodulation outputs, each of said first and second switch means including a first switch having an input and output with the input of said first switch being coupled to receive said first transducer signal, a second switch having an input and an output with the input of said second switch being coupled to receive said inverted first transducer signal, a third switch having an input and an output with the input of said third switch being coupled to receive the second transducer signal, and a fourth switch having an input and an output with the input of said fourth switch being coupled to receive the inverted second transducer signal, the output of each of said first, second, third, and fourth switches of said first switch means being coupled in common to provide a first demodulation output and the output of each said first, second, third and fourth switches of said second switch means being coupled in common to provide a second demodulation output, each of said switches having a means for intermittently coupling the input of each switch to its output in response to a squarewave switching signal, wherein each of said first, second, third and fourth switches of the first switch means are driven by the same squarewave switching signal as the first, second, third, and fourth switches, respectively, of the second switch means, and each of said demodulation outputs represents acceleration in an axis perpendicular to one another and to said common axis.

5. A transducer and signal demodulation system comprising:

first and second acceleration sensors mounted about a common axis and angularly spaced about that axis by 180° with respect to one another;

third and fourth acceleration sensors mounted for rotation about said common axis and angularly spaced from one another by 180°, said third and fourth sensors each being angularly spaced from said first and second sensors about said common axis by 90°;

means coupled to each sensor for providing a sensor signal;

means for coupling the sensor signals of said first and second sensors in common to provide a first transducer signal;

means for coupling the sensor signals of said third and fourth sensors in common to provide a second transducer signal;

means coupled to said first transducer signal for providing an inverted first transducer signal and means coupled to said second transducer signal for providing an inverted second transducer signal;

first and second switch means for providing first and second demodulation outputs, each of said first and second switch means including a first switch having an input and output with the input of said first switch being coupled to receive said first transducer signal, a second switch having an input and an output with the input of said second switch being coupled to receive said inverted first transducer signal, a third switch having an input and an output with the input of said third switch being coupled to receive the second transducer signal, and a fourth switch having an input and an output with the input of said fourth switch being coupled to receive the inverted second transducer signal, the output of each of said first, second, third, and fourth switches of said first switch means being coupled in common to provide a first demodulation output and the output of each said first, second, third and fourth switches of said second switch means being coupled in common to provide a second demodulation output, each of said switches having a means for intermittently coupling the input of each switch to its output in response to a switching signal, and wherein said first and seoond demodulation outputs represent acceleration in two axes which are perpendicular to one another and to said common axis.

6. The system of claim 5 wherein said acceleration sensors are piezoceramic elements.

7. A transducer and demodulation system comprising:

first and second acceleration sensors mounted about a common axis and angularly spaced about that axis by 180° with respect to one another;

third and fourth sensors mounted for rotation about said common axis and angularly spaced from one another by 180°, said third and fourth sensors each being spaced angularly from said first and second sensors about said common axis by 90°;

means associated with each sensor for providing a sensor signal;

means for coupling the sensor signals of said first and second sensors in common to provide a first transducer signal;

means for coupling the sensor signals of said third and fourth sensors in common to provide a second transducer signal;

a first rate sensor and a second rate sensor coupled for rotation about said common axis and angularly spaced 180° with respect to one another about said common axis and 450° with respect to at least one of said acceleration sensors;

means for providing a rate sensor signal from each of said rate sensors;

means for demodulating the rate sensor signals for providing two axis rate signals;

means coupled to said first transducer signal for providing an inverted first transducer signal and means coupled to said second transducer signal for providing an inverted second transducer signal;

first and second switch means for providing first and second demodulation outputs, each of said first and second switch means including a first switch having an input and output with the input of said first switch being coupled to receive said first transducer signal, a second switch having an input and an output with the input of said second switch being coupled to receive said inverted first transducer signal, a third switch having an input and an output with the input of said third switch being coupled to receive the second transducer signal, and a fourth switch having an input and an output with the input of said fourth switch being coupled to receive the inverted second transducer signal, the output of each of said first, second, third, and fourth switches of said first switch means being coupled in common to provide a first demodulation output and the output of each said first, second, third and fourth switches of said second switch means being coupled in common to provide a second demodulation output, each of said switches having a means for intermittently coupling the input of each switch to its output in response to a switching signal; and means for providing a switching signal to each of said first, second, third and fourth switches of said first and second switch means such that the same switching signal is applied to the corresponding switches of each switch means.

* * * * *